INVENTOR.
JEAN-PAUL MEUNIER
BY
Bauer and Seymour
ATTORNEYS

INVENTOR.
JEAN-PAUL MEUNIER

BY

Bauer and Seymour
ATTORNEYS

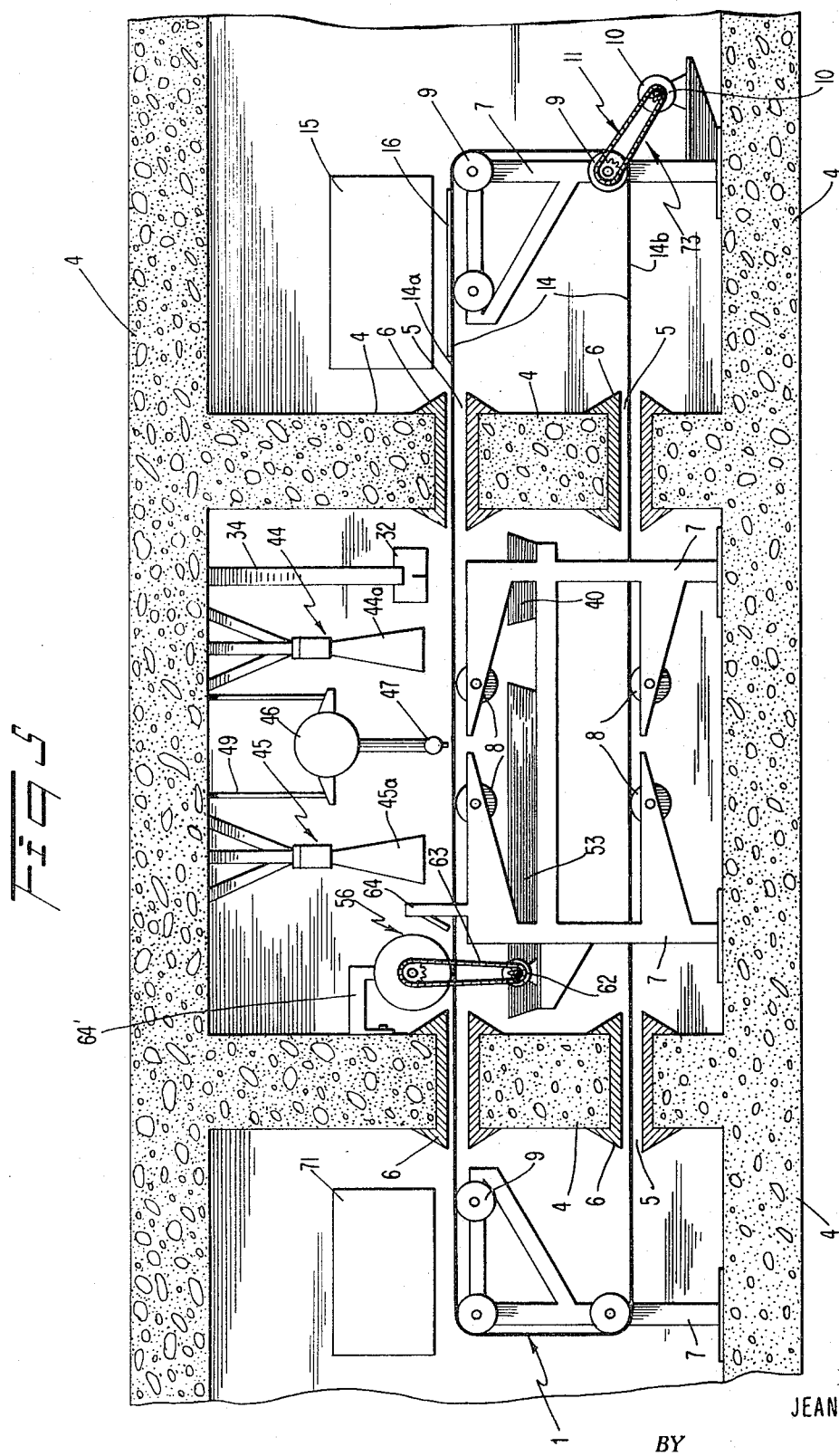

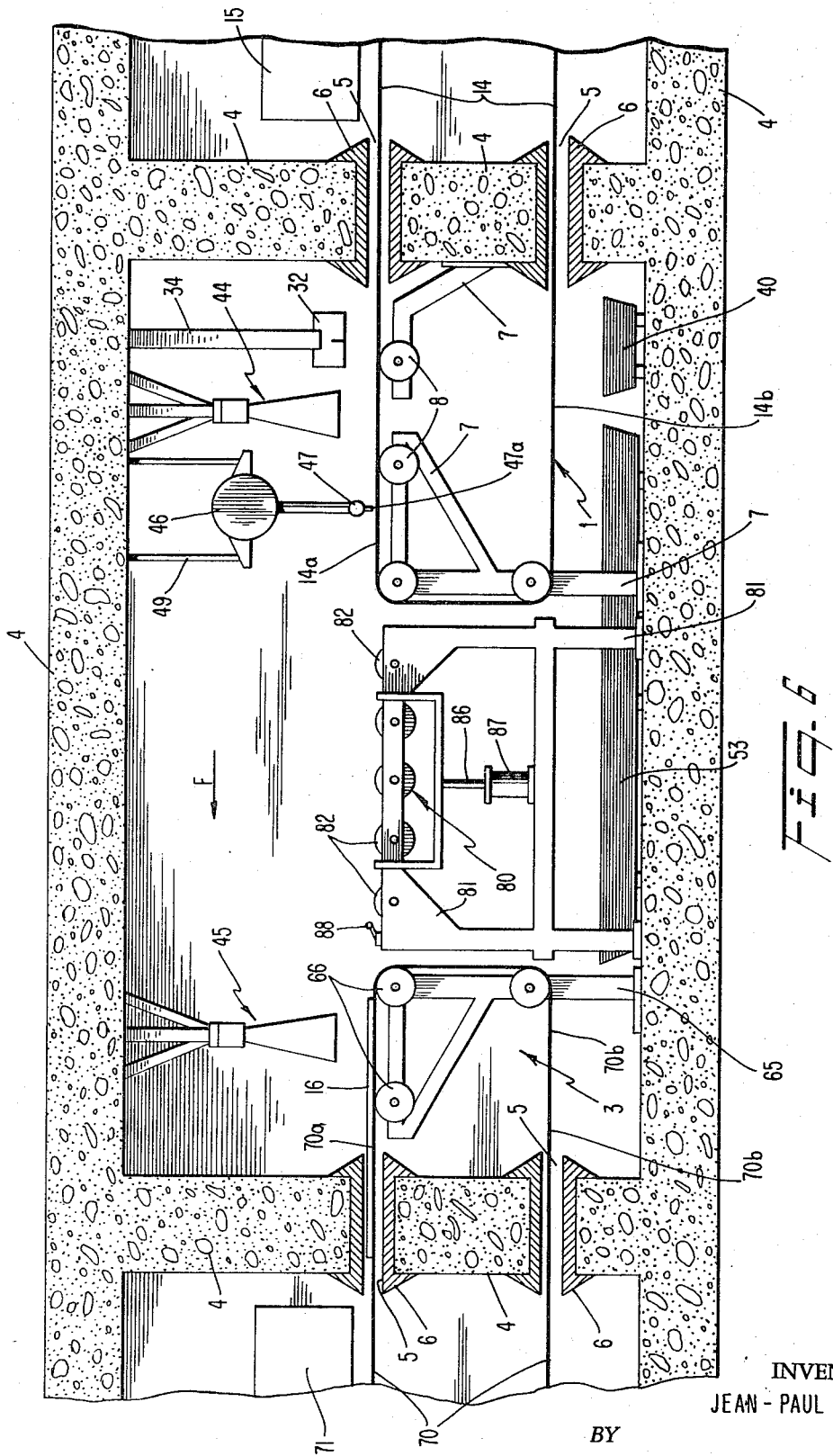

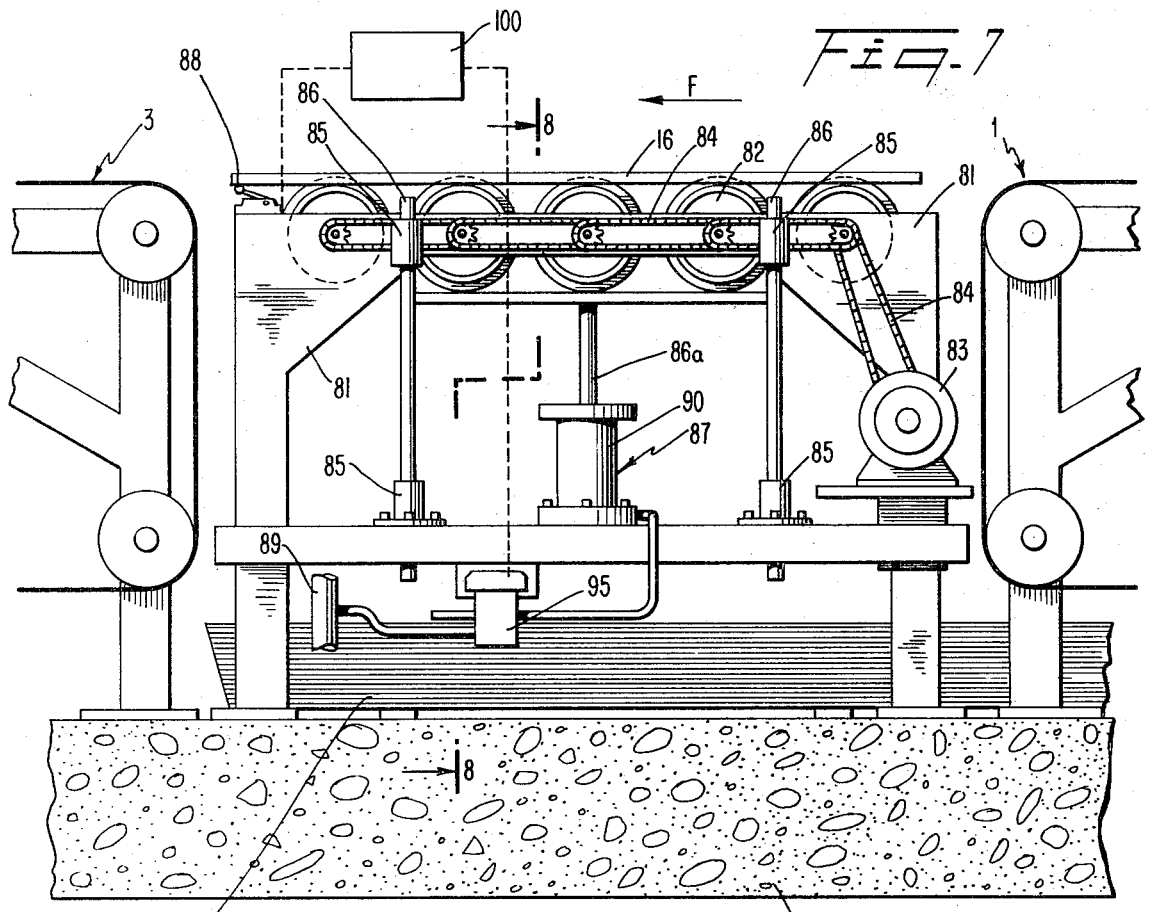
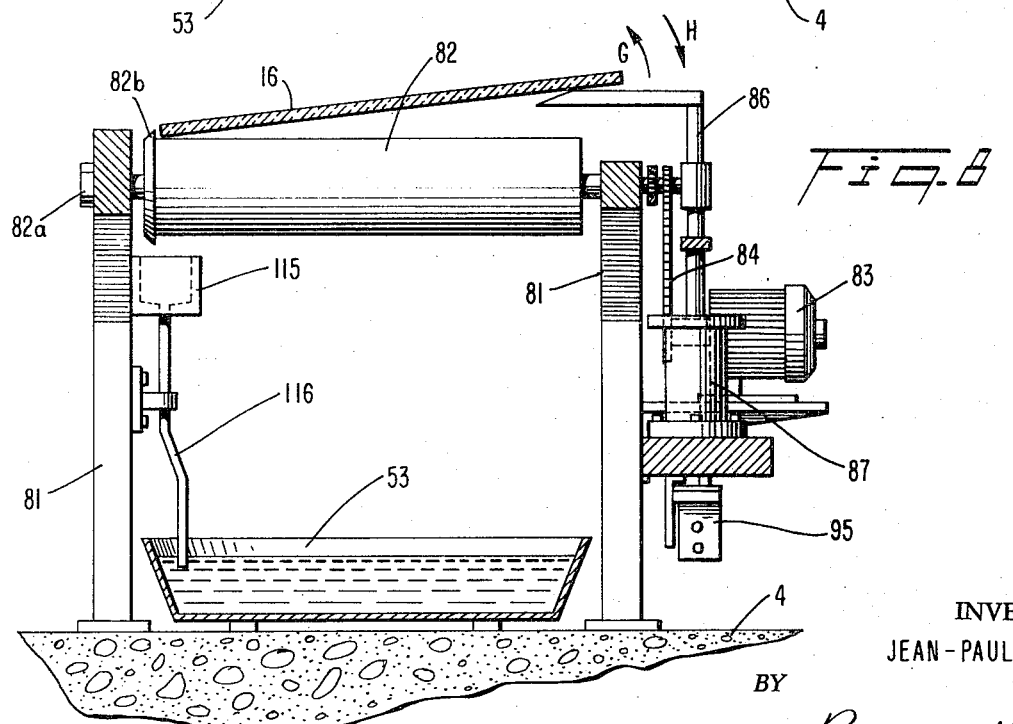

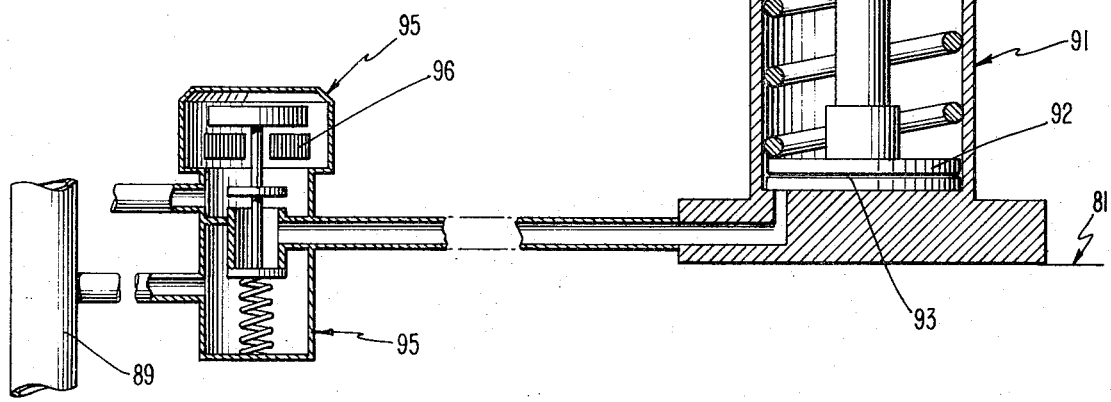
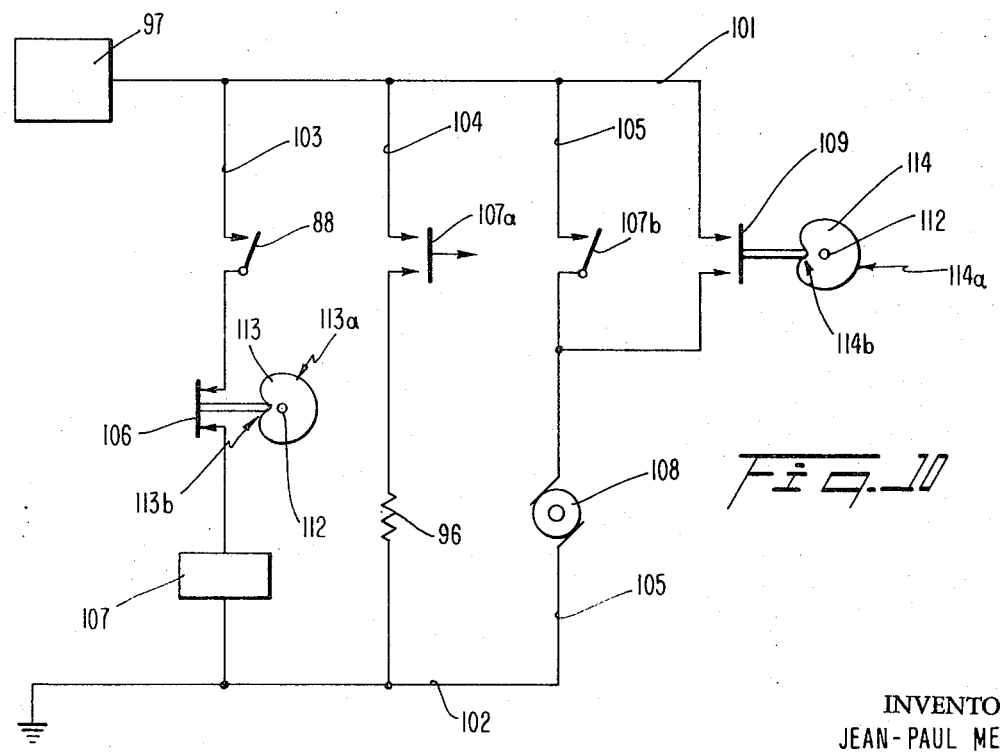

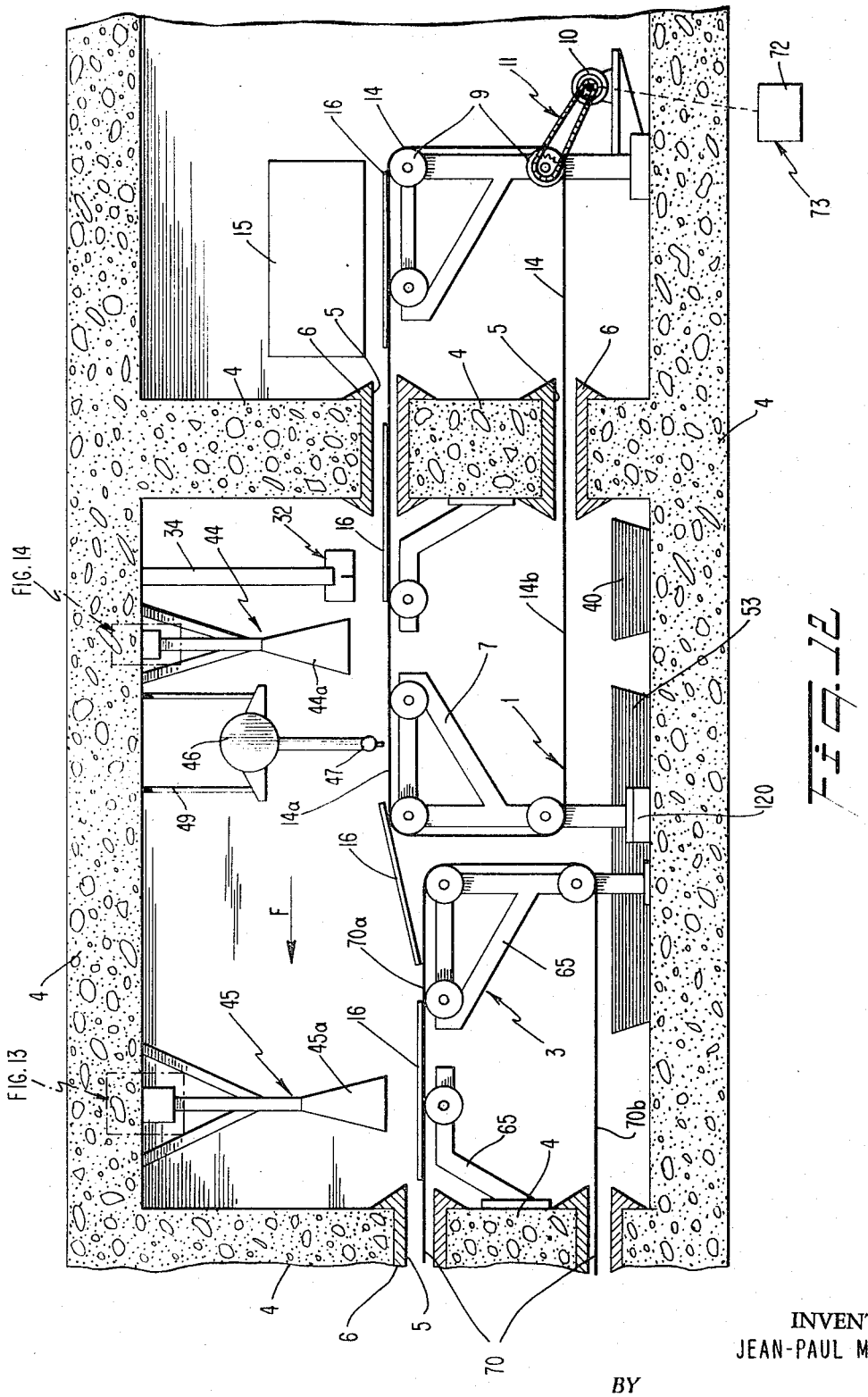

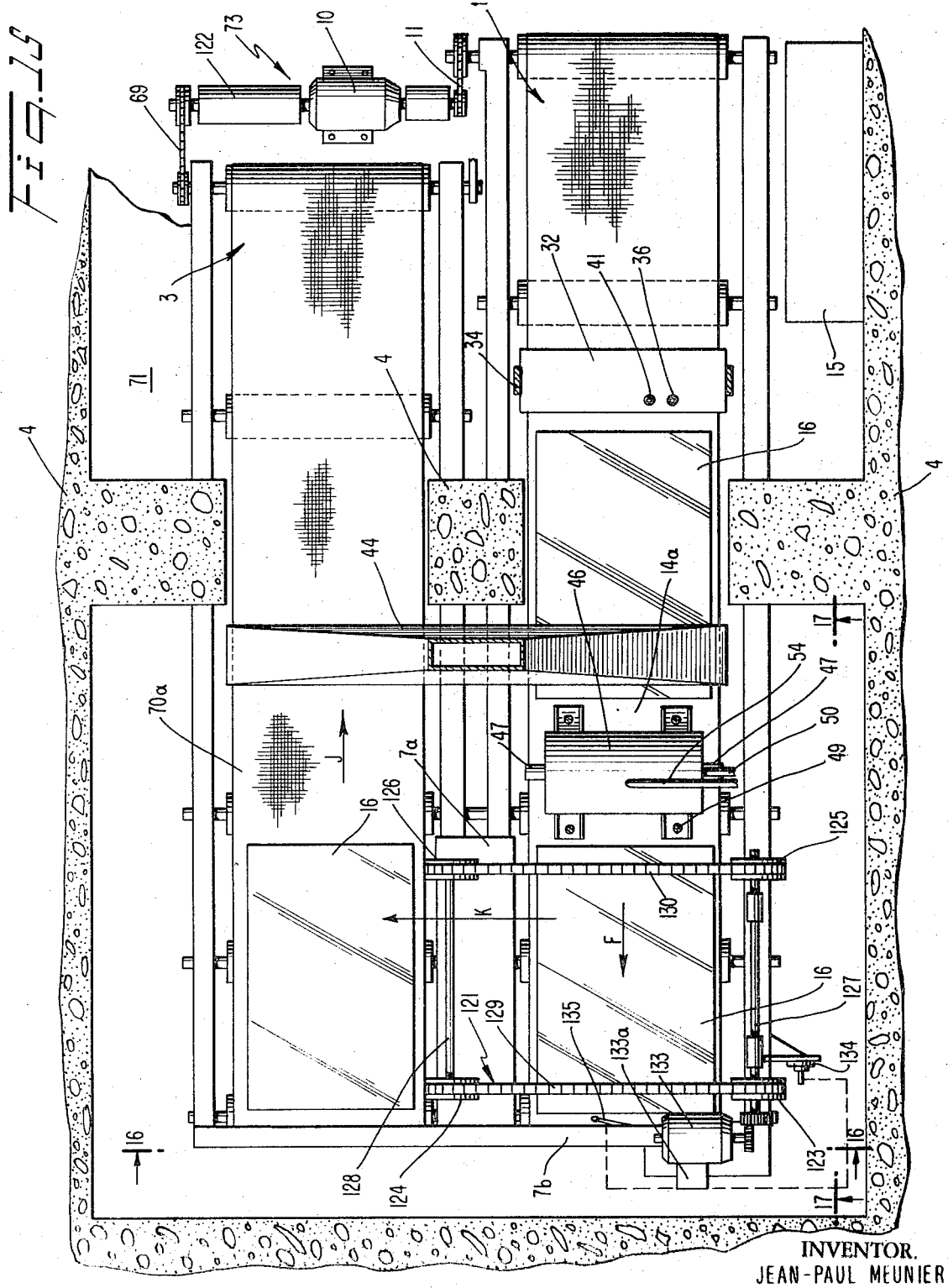

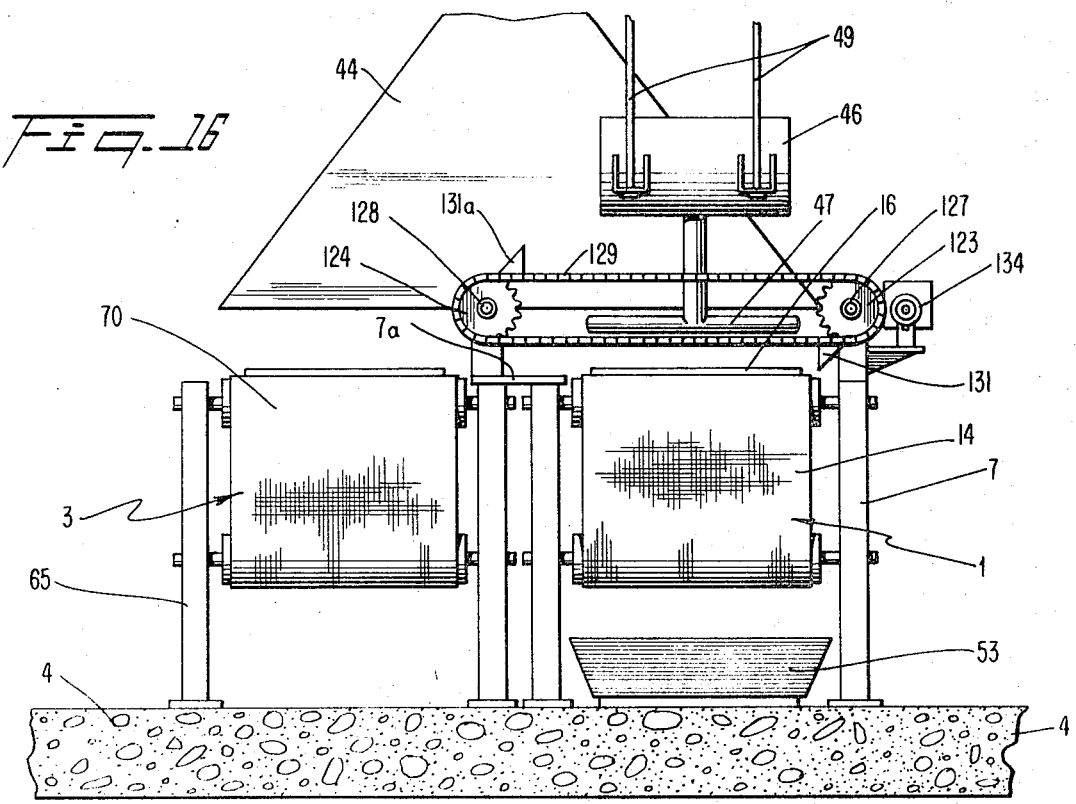
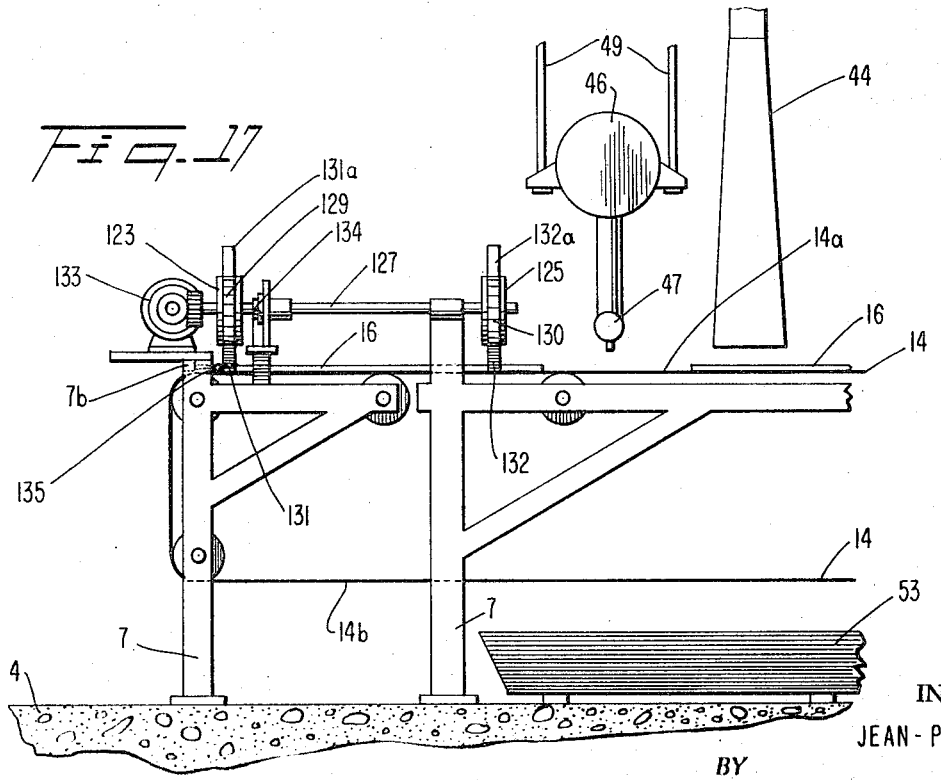

INVENTOR.
JEAN-PAUL MEUNIER
BY
Bauer and Seymour
ATTORNEYS

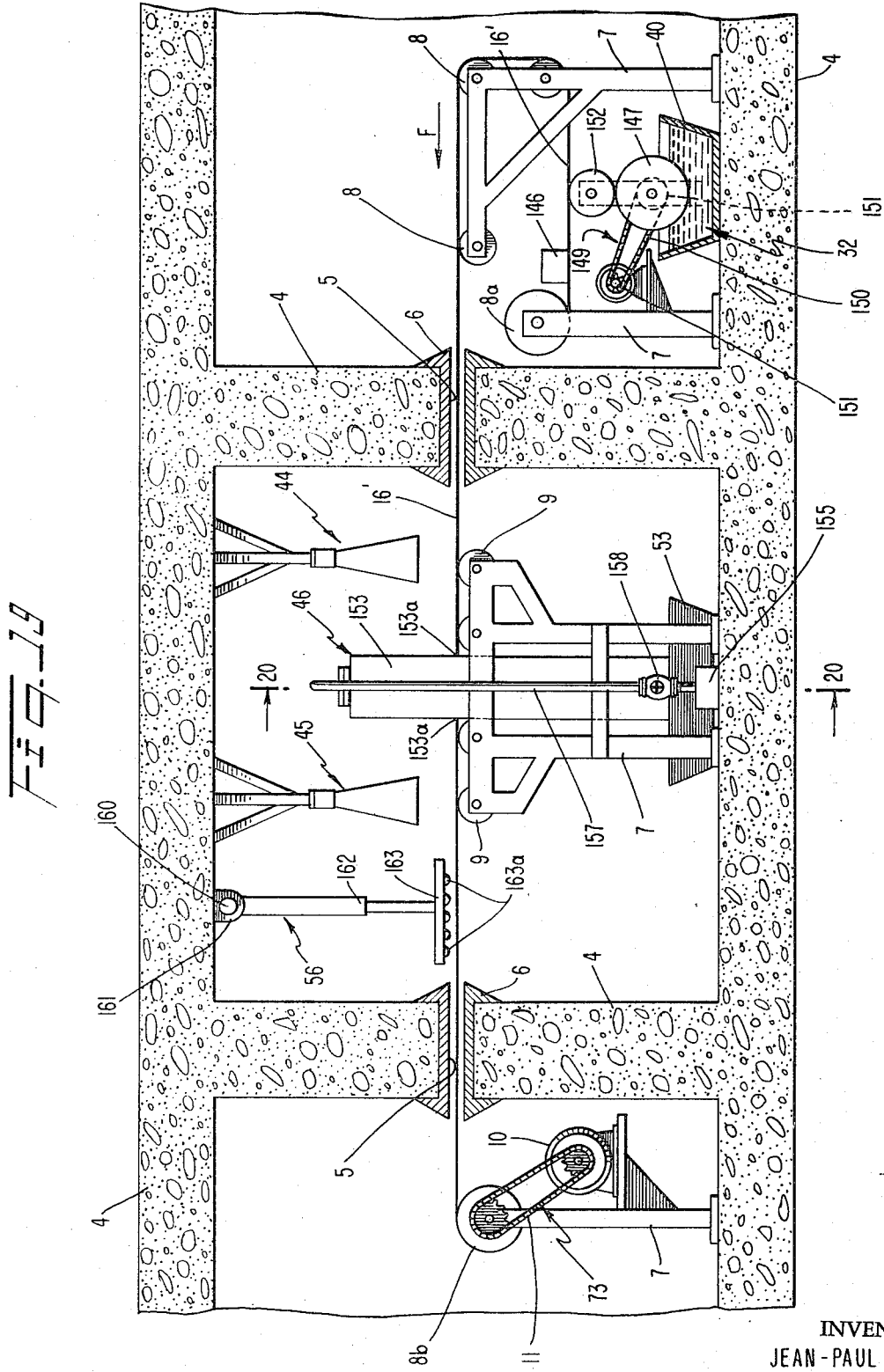

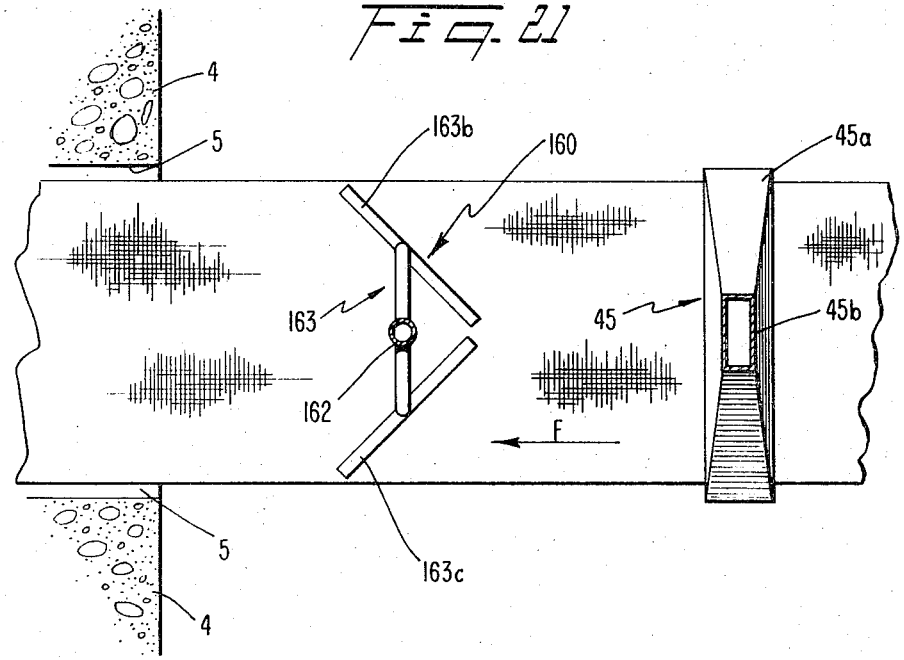
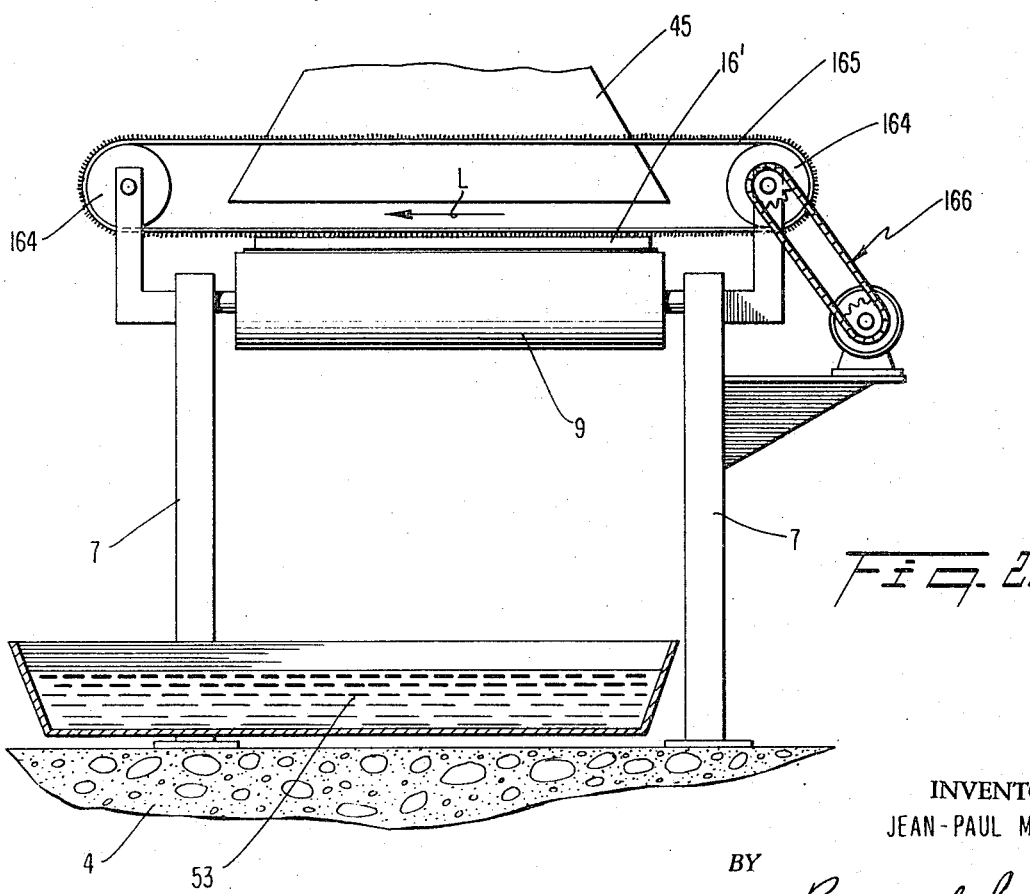

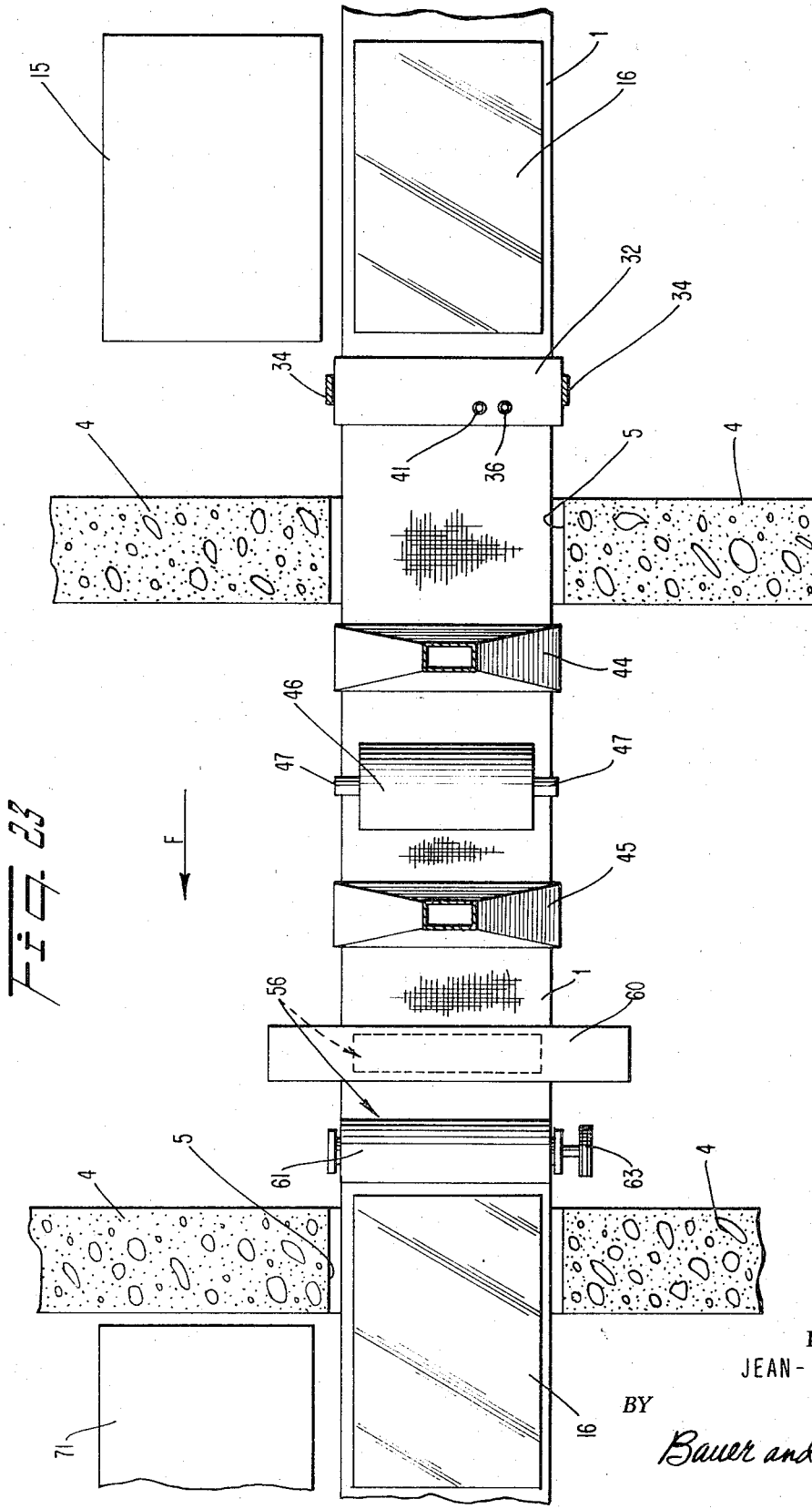

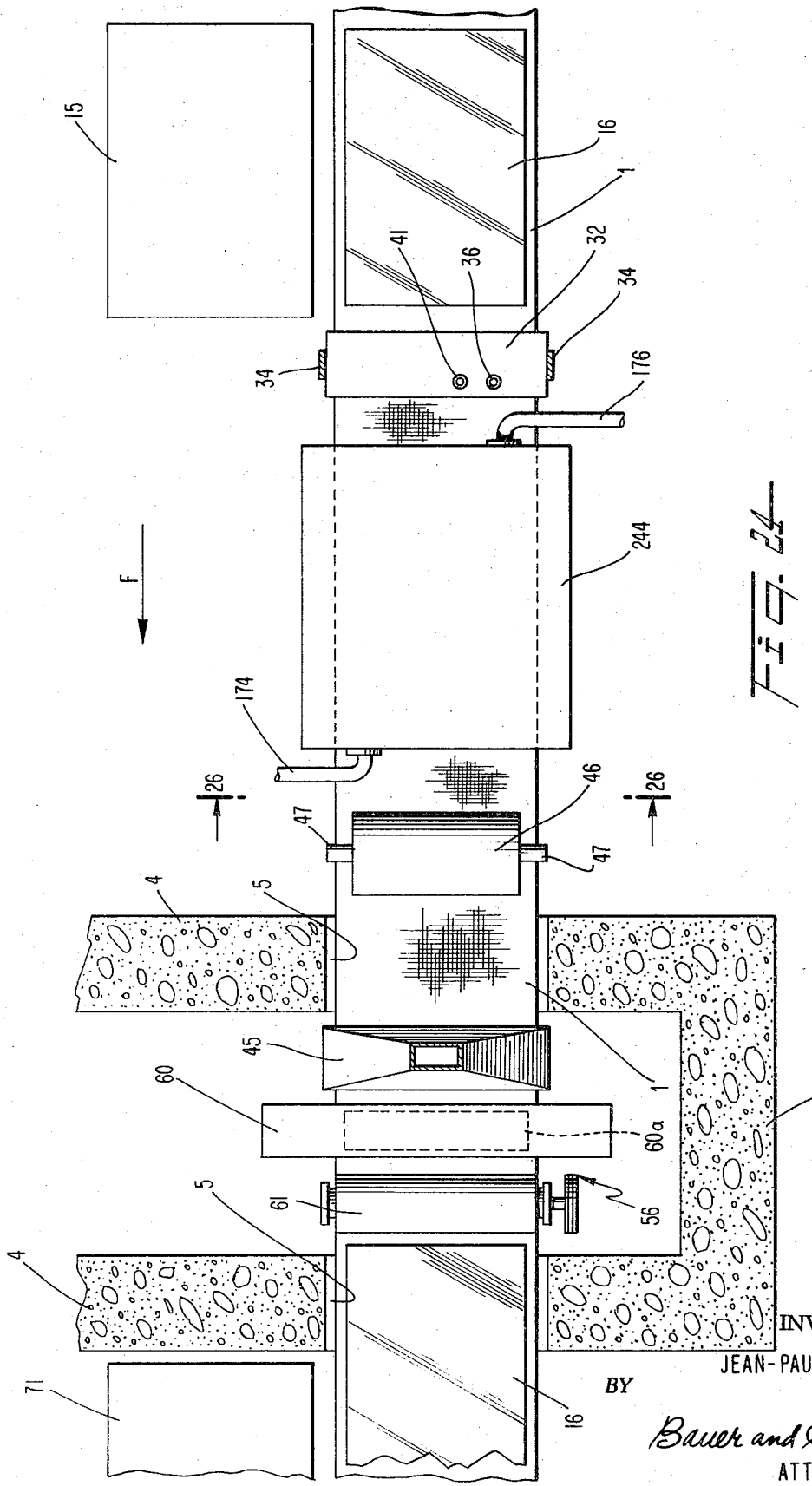

Nov. 5, 1974     JEAN-PAUL MEUNIER     3,846,149
METHODS, MEANS AND COMPOSITIONS FOR PAINTING OBJECTS
Filed June 12, 1970     17 Sheets-Sheet 17
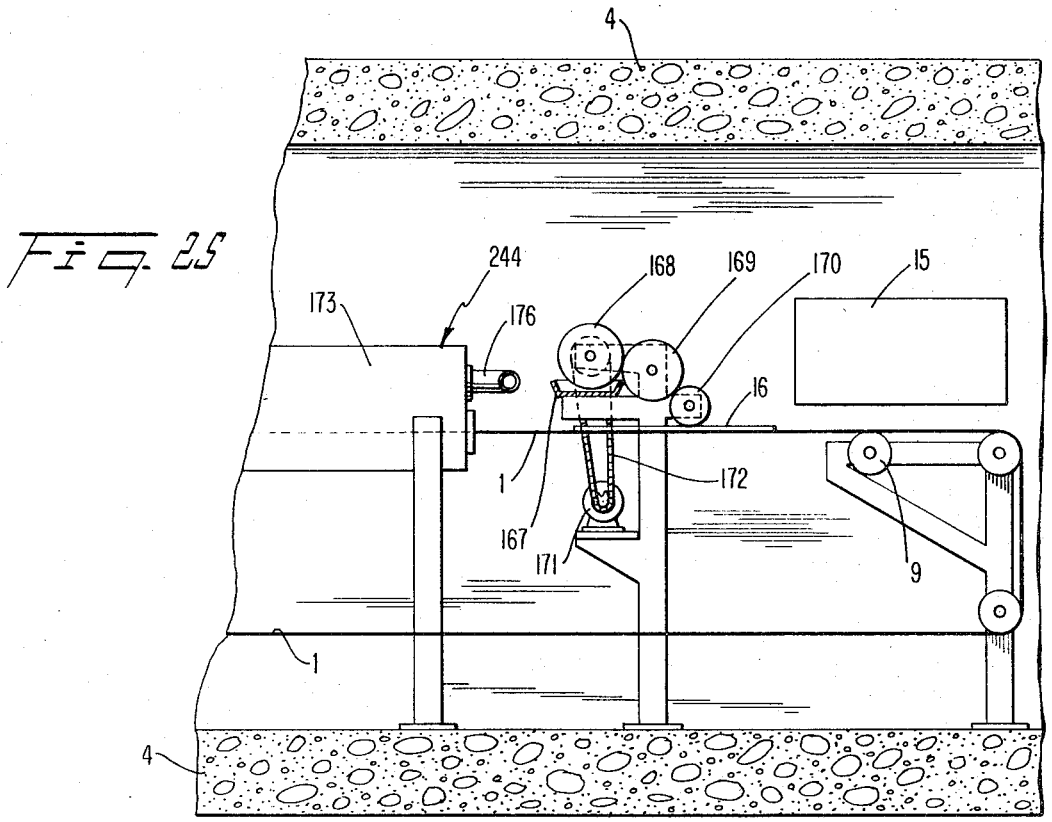
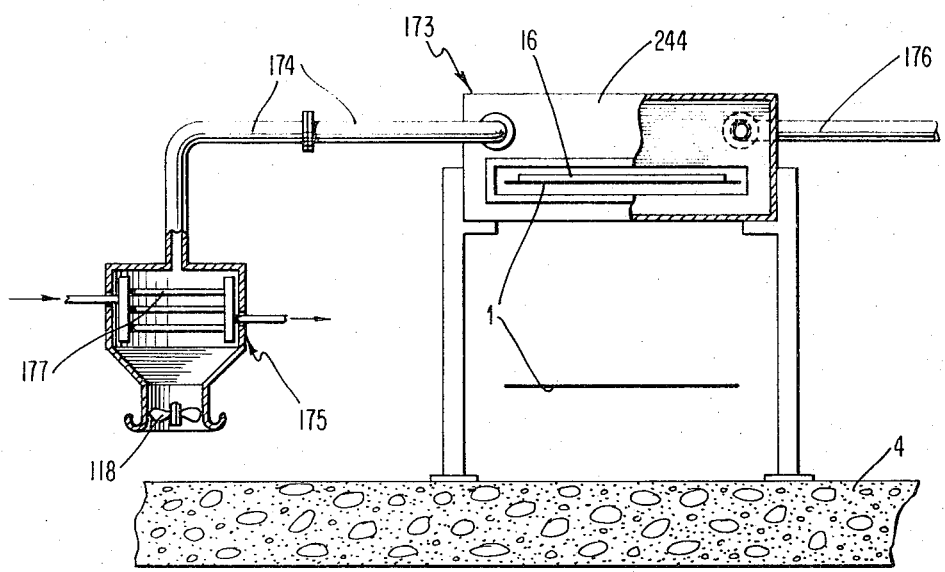
INVENTOR.
JEAN-PAUL MEUNIER
BY
Bauer and Seymour
ATTORNEYS United States Patent Office 3,846,149
Patented Nov. 5, 1974

3,846,149
METHODS, MEANS AND COMPOSITIONS FOR PAINTING OBJECTS
Jean-Paul Meunier, Asnieres, France, assignor to Conservatome, Courbevoie, France
Filed June 12, 1970, Ser. No. 45,865
Claims priority, application France, June 13, 1969, 6919790; June 4, 1970, 7020492
Int. Cl. B44d 1/50
U.S. Cl. 117—6    16 Claims

ABSTRACT OF THE DISCLOSURE

This invention involves a process and apparatus for painting objects, the paint being first solidified, that is to say carried to an intermediate stage of polymerization, and thereafter hardened by ionizing radiation. The solidification may be carried out by ionizing radiation, by heat or otherwise but between that step and the hardening by ionizing radiation is interposed the coating of the painted surface with a liquid transparent to the radiation and inert to the paint. Apparatus for carrying out the process is described in detail with variations. The imposition of rays is within shields. Hardened panels are produced rapidly in large number.

---

This invention relates to methods, means and compositions for painting objects. The noun paint and the verb to paint are not synonymous, the noun referring to a coating composition containing a vehicle or film-forming ingredient, such as linseed oil or a polyester resin, a pigment, such as titanium dioxide or one of numerous diazo pigments, and usually hardeners, thinners and the like, whereas the verb refers to the act of applying any kind of composition which includes a vehicle, such as varnishes, paints, and even stains. Methods of painting are numerous, by brush, by spraying, by dipping, being exemplary. Varnishes include a vehicle, usually exclude all pigmentation, and sometimes include soluble stains. The vehicle of paints is usually a natural drying oil or a synthetic resin whereas the film-forming base of varnish is usually a fossil or a synthetic resin. The word vehicle is better used when referring to the function of the film forming material to suspend the pigment, and the phrase film-forming material is better when reference is to its coating action.

The objects of painting are to protect, adorn, and impart qualities to a surface. The number of objects painted and the number of coating compositions used to paint them is innumerable, but there is an industry in present operation the output of which, in painted objects, is very great and the present invention will be described in its relation to that industry, keeping in mind the fact that the invention is applicable to the protection of any surface by a coating composition. The industry referred to is the production of panels with a surface coated with paint or varnish, for instance wood, plywood, or metal panels, or even panels in which the backing material is granular, such as sawdust, and the coating composition not only forms a protective surface but constitutes a bonding agent which unites the particles of the backing. In that industry, every effort is made to produce the panels by assembly line methods but the problems are many and difficult of solution, including problems of composition, drying, hardening, manipulation, speed, and quality of result. A simple test usually suffices to exclude products of poor quality: the fingernail scratch test.

The hardening of linseed oil paints, for example, is a process of long duration when the paint is applied by classical methods, and such methods are in consequence not suited to assembly line production. Other paints dry faster than linseed oil paints but they also suffer from various defects. The so-called laquers are usually paints which contain film-forming materials of synthetic resin and thinners of synthetic organic liquids. In this specification we will attempt to adhere to these terminological usages without attempting to establish them as definitions of equatorial exactitude.

It has been proposed to paint panels, e.g. of wood, metal, or plastic, with paint or varnish and to harden them by ionizing radiation to a degree which resists the fingernail test. Such paints and varnishes contain a film-forming material of organic resin base which will polymerize under ionizing radiation, including the types called electromagnetic ionizing radiation and high energy particle radiation. It is possible to use electrons having an energy value between 150 and 600 kiloelectronvolts issuing from an accelerator head supplied by high tension electric current for this purpose.

Unfortunately, when such attempts at hardening paint or varnish have been made the surface produced will not withstand the fingernail test but is easily scratched, whereas the areas hardened by other methods have been harder. Consequently, the use of ionizing radiation has required the protection of the surface by means of a solid pellicle or by the use of an inert gas such as helium, nitrogen, $CO_2$ or the like during the treatment. The pellicles used have been organic or metallic and transparent to ionizing radiation and have been applied to the coated surface before the use of the rays for polymerization, but even when the adherence of such pellicles is slight it often affects the surface and its removal produces serious technical problems. The use of an inert atmosphere, on the other hand, is costly, and technically inconsistent as it involves the generation, distribution, and application of the gaseous fluid, especially when the operation is continuous as in industrial practice.

It is an object of this invention to overcome the faults of the prior art, to produce objects coated with film-forming materials, which have hard surfaces; to produce them by assembly line methods, rapidly, at low cost; to make novel apparatus for the hardening of such painted objects by safe and novel methods of using ionizing radiation; to develop novel paints and varnishes specially adapted to use by the novel methods of irradiation; and to provide methods and apparatus of versatile nature adapted to facile change to meet different conditions and the needs of different types of objects.

The objects of the invention are accomplished, generally speaking, by a method of painting an object which comprises applying thereto a fluid coating composition having a hardenable vehicle, solidifying the coating composition, applying a liquid film transparent to ionizing radiation and impermeable to oxidizing gases to the coating composition, and applying ionizing radiation of hardening intensity through the said film to the coating composition until it is hardened; and by a method of painting an object which comprises applying thereto a fluid coating composition, solidifying it with ionizing radiation, coating it with a film transparent to ionizing radiation and impervious to gas, and applying ionizing radiation through the film; and by apparatus for painting an object which comprises, means to coat the object with a fluid coating composition, means to solidify the coating composition, means to apply to the coating composition a protective film permeable to ionizing radiation, and means to apply ionizing radiation to the coating composition through the film; and by apparatus for painting objects comprising conveyor means, and means thereabove to paint the object and harden the paint thereon, including in sequence distributor means to coat the object with a coating composition, electron accelerator means, distributor means to apply a liquid film to the coated object, electron accelerator means, and means to dry the object; and by a liquid coating composition having as its essential film-forming ingredients a polyester resin, styrene, and an inhibitor of polymerization.

The novel method applies a coating composition, and hardens it in two steps, the first step being a solidification in which the polymerization or setting of the film-forming material is carried only to the solid state, not to completion, a film of inert, protective liquid permeable to ionizing radiation is applied, and polymerization, setting, or hardening is carried to completion by ionizing radiation applied through the protective lisuid, the liquid eventually being eliminated. The step of solidification or partial polymerization is carried out by heating, or chemically, or preferably by the use of ionizing radiation.

The layer of coating composition produced by this invention is smooth, hard, and impossible or extremely difficult to mar with the fingernail. The method is of low cost as the protective liquid may be water, to which may be advantageously added a few tenths at most of its weight of a surface active agent such as the alkali salt of the acid sulfate of a fatty alcohol, e g. the sodium acid sulfate of oleic alcohol. According to the invention it is not necessary to produce and apply a gas to the coated object, an expensive and difficult process often involving helium.

The present invention includes an apparatus for the process, including means to apply the coating composition, means to irradiate it, means to move the coated object from station to station of the steps of the process, means to solidify the coating composition, means to apply the protective liquid, and means to produce and apply the radiation.

The objects, advantages, and accomplishments of the several phases of the invention can be followed by reference to the preferred apparatus and its modifications as displayed in the drawings.

FIG. 5 is a diagrammatical view in elevation of a modified form of apparatus.

FIG. 6 is analogous to FIG. 5, showing another modification.

FIG. 7 is an enlarged elevation of the central part of FIG. 6, with details.

FIG. 8 is a section on line VIII—VIII of FIG. 7.

FIG. 9 is an elevation in section of part of the tilting means of FIG. 8.

FIG. 10 is a diagram of the control circuitry for the tilting mechanism.

FIG. 12 is similar to FIG. 5 but showing a third modification.

FIG. 15 is a plan view of a fourth modification.

FIG. 16 is an elevation as seen from position XVI of FIG.15.

FIG. 17 is an elevation from position XVII of FIG. 15.

FIG. 19 is an elevation of a fifth modification.

FIG. 21 is a plan view of the wiping apparatus of FIG. 19.

FIG. 22 is a modification of the wiping apparatus of FIG.22.

FIG. 23 is a diagrammatical plan view of the apparatus of FIG. 5.

FIG. 24 is a variant of FIG. 23.

FIG. 25 is a modified form of paint applicator in side elevation, and

FIG. 26 is a section on line XXVI—XXVI of FIG. 24 showing construction.

Figure 1:
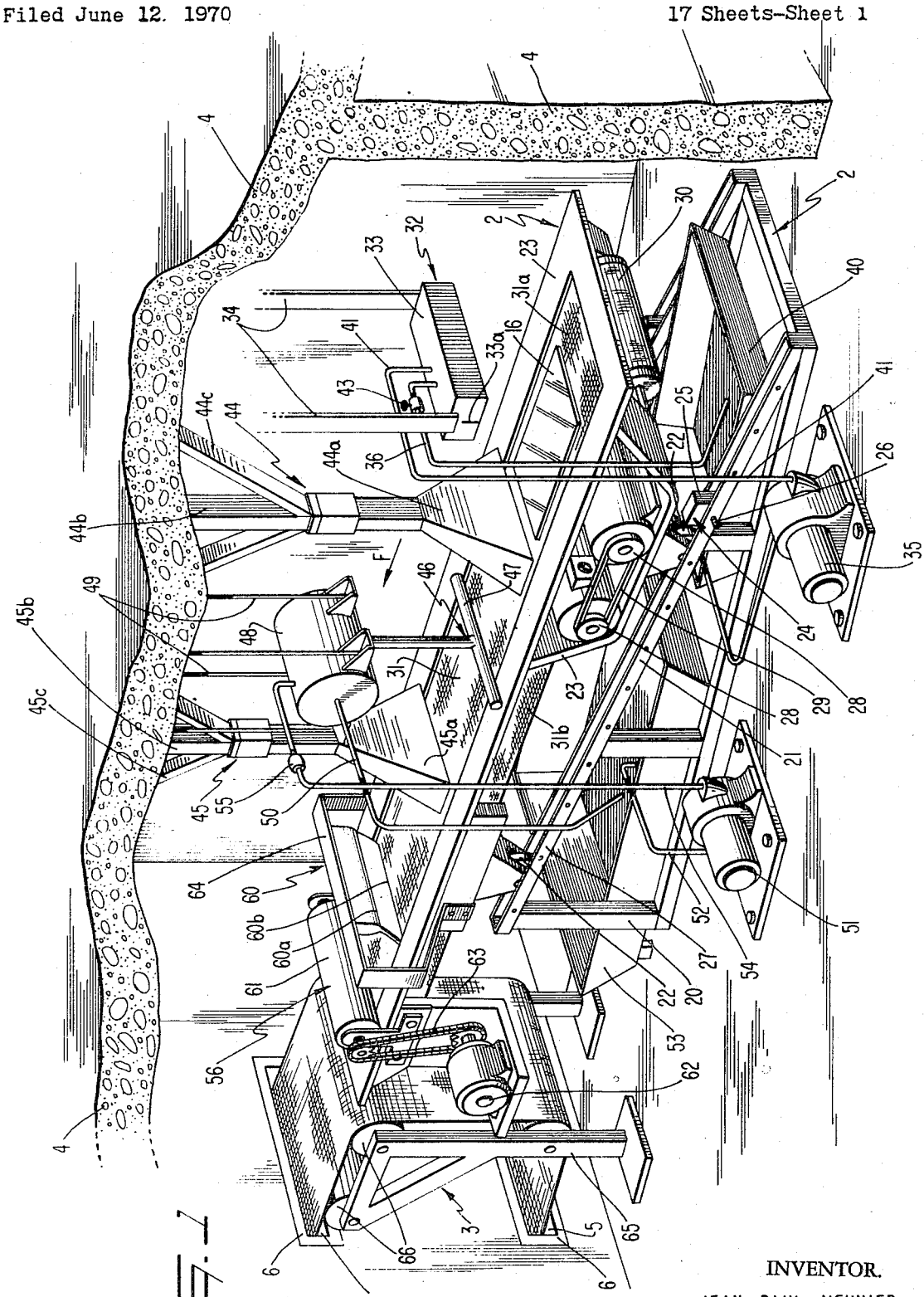
FIG. 1 is a perspective view of one form of the invention.
Figure 2:
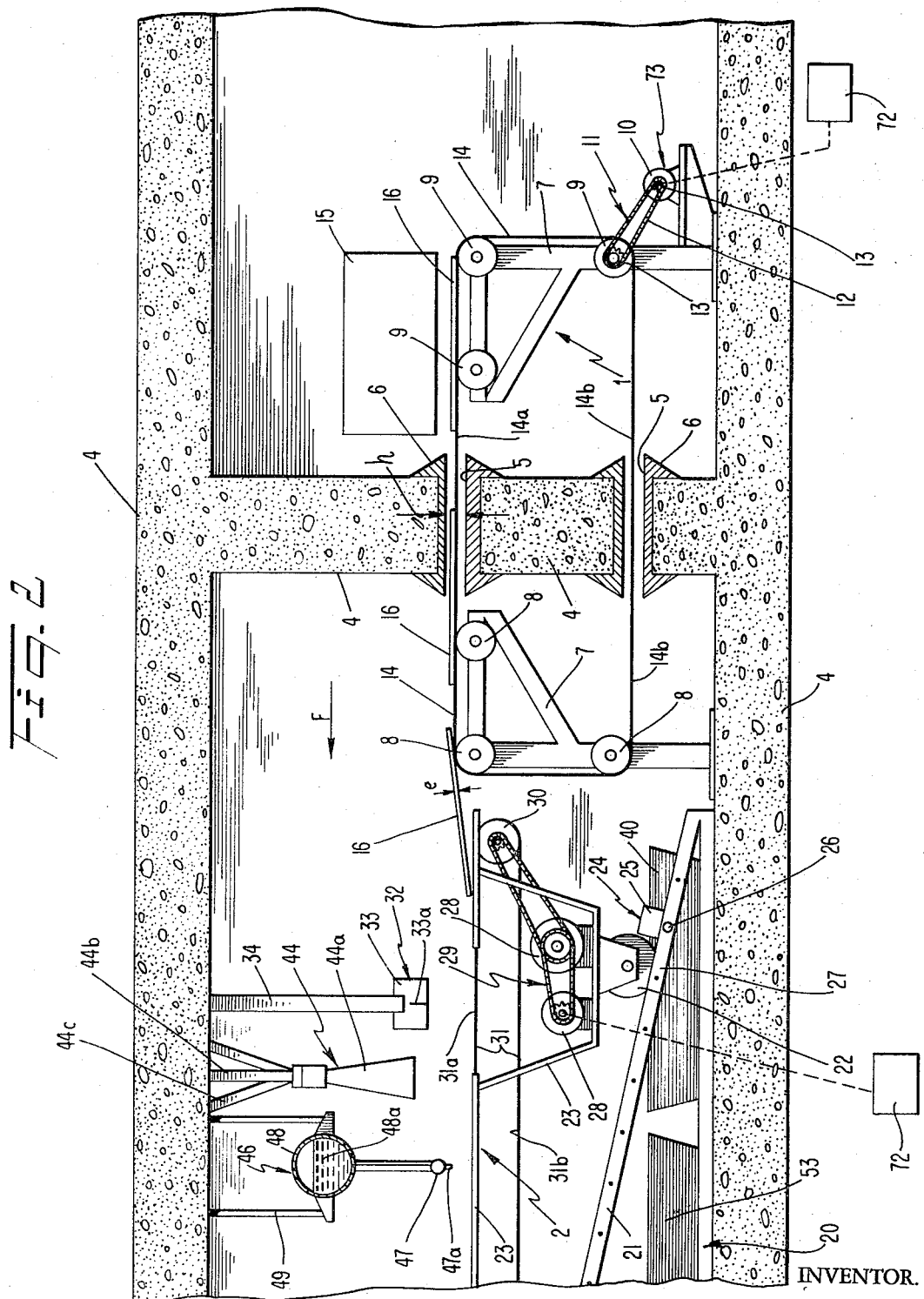
FIGS. 2, 3 and 4 are diagrammatical views in elevation of what for some purposes is a preferred form of the invention, FIG. 2 being a view of the right half of the apparatus, FIG. 3 a similar view of the left half, and FIG. 4 a similar view of a modification.
Figure 3:
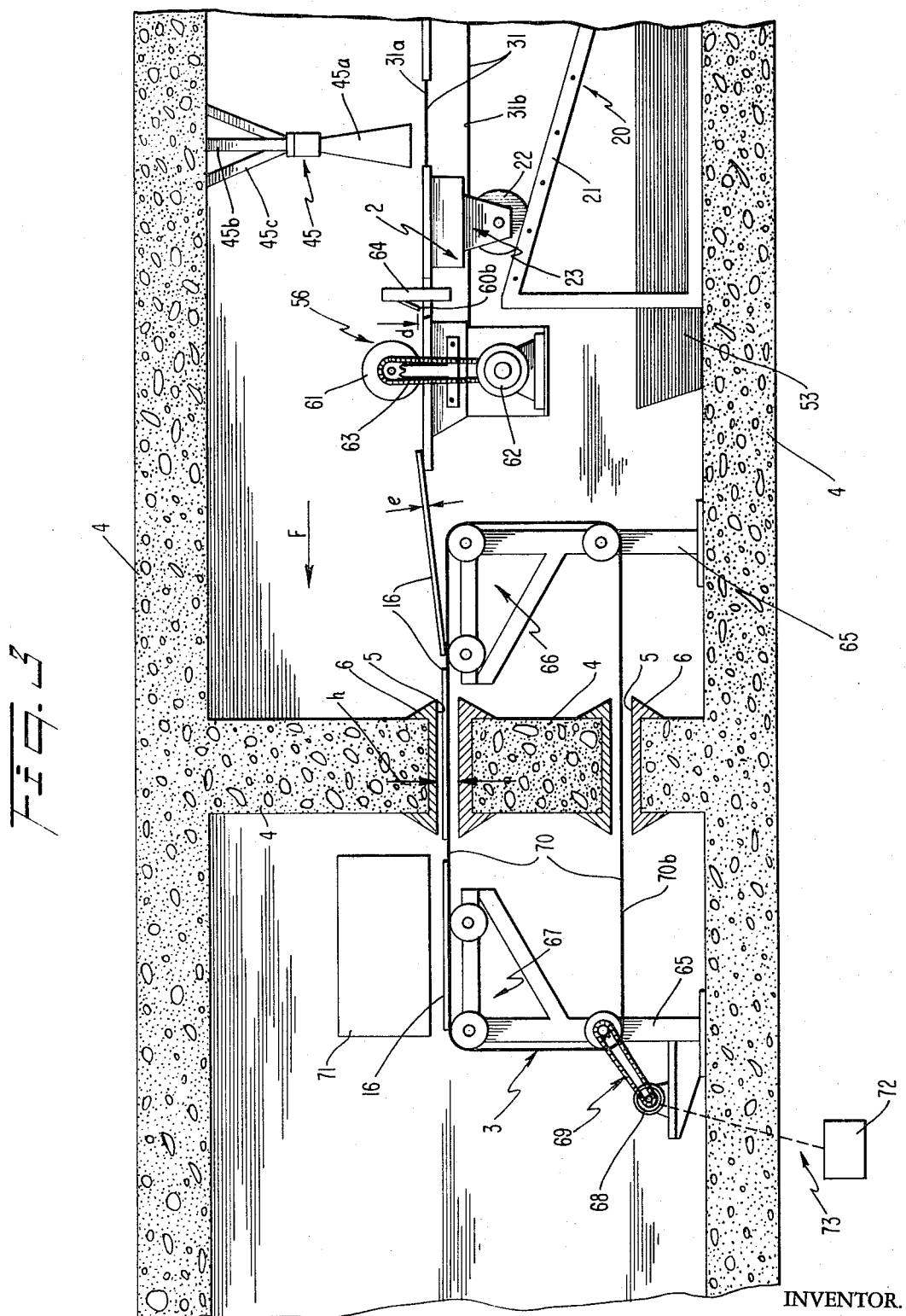
Figure 4:
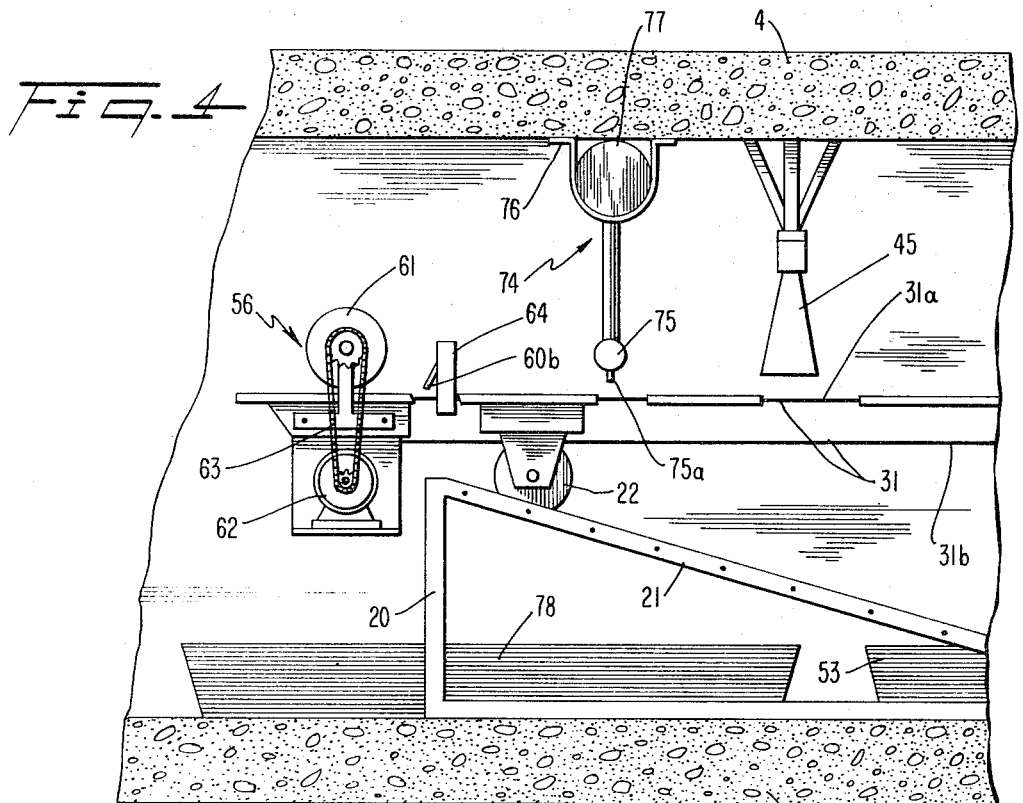
Figure 11:
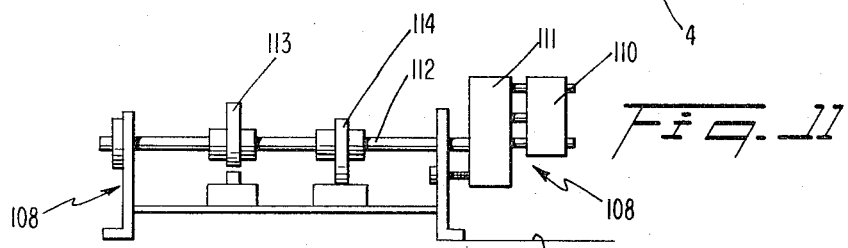
FIG. 11 is a diagram of the apparatus schematically indicated in FIG. 10.
Figures 13, 14:
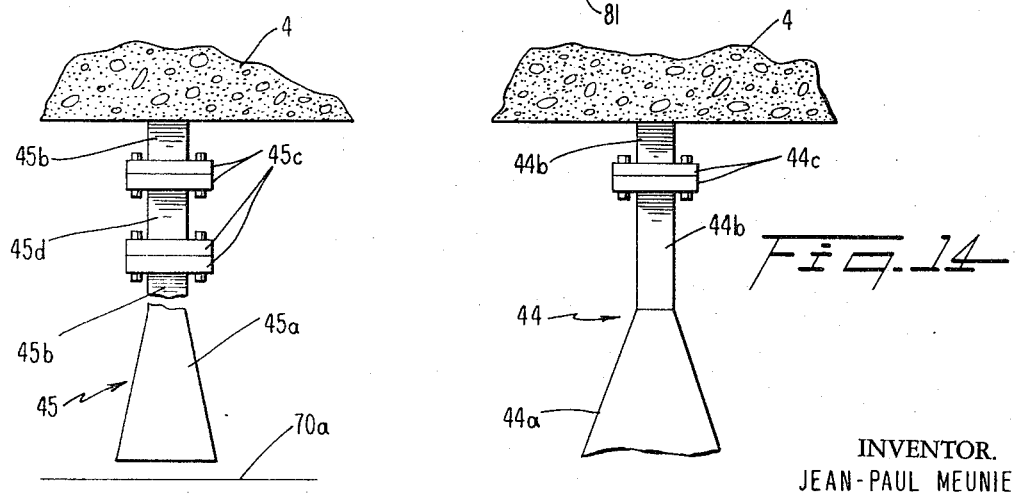
FIG. 13 is an enlarged view of part XIII of FIG. 12.
FIG. 14 is a similar view of part XIV of FIG. 12.

In FIG. 1 is shown an apparatus which includes a belt conveyor of three sections 1, 2, 3, and a protective chamber 4 which encloses conveyor 2, which is provided with apertures 5 for the admission and discharge of the panels 16 which are to be painted and the courses of the conveyor. These apertures have a vertical dimension "$h$" established by the projecting lead shields 6 which face the apertures, prevent the emission of radiation, and restrict the quantity of air which can be admitted.

The belt conveyor 1 is at the upstream end of the machine and it comprises a frame 7, part in and part out of the chamber defined by shields 4, rollers 8 inside the chamber and 9 outside, the upper and lower courses of the belt passing through slits 5.

On rollers 8, 9 is trained a belt conveyor 14 having an upper course 14a and a lower course 14b passing through openings 5. The upper course moves in the direction of the arrow F and is associated with a loading means 15 which deposits wood panels 16 upon it. Wood panels are representative of metal panels, plywood, veneering, glass sheets and the like which have a thickness capable of passing between the lead shields 6 and of adhering to coating compositions. The loading can be by hand rather than by the machine 15.

The belt conveyor 2 is supported by a frame 20 within the shields 4 and includes an inclined ramp 21 upon which runs a truck supported by wheels 22. The truck (22, 23) can be fixed in position by a block 25 fixed in position by a pin 26 which can be passed through the block and any of several holes 27 in the ramp. A variable motor or reducing motor 28 is mounted on portion 23 of the truck. It is connected by a transmission 29, which is similar to the chain drive 10, 11 for the first of the belt conveyors, to a roller 30 about which the belt conveyor 31 passes. The belt conveyor is preferably perforated and has upper course 31a and lower course 31b. The upper surface, driven by motor 28 is surmounted by an apparatus 32 for applying varnish. Such a machine is known and will be described only briefly. As represented in the drawing, this machine for applying varnish includes a reservoir 33 suspended from the upper shield 4 by brackets. The apparatus includes a slot 33a of variable width through which the varnish falls onto the object being painted. A pump 35 is provided with aspiration pipe 36, the end of which is in a sump 40 filled with varnish and with pipes 41 attached to the reservoir 33 which permits the filling of the apparatus 33 with varnish under pressure. A conduit 42 controlled by a valve 43 connects the apparatus 33 to the free air.

Beneath the upper course 31a and downstream of the painting apparatus 32 are two electron accelerators 44, 45 formed with heads of emission 44a, 45a and bodies 44b, 45b which are connected to the upper shield by appropriate means 44c, 45c. These accelerators are of a known type supplied by electric current from a source not shown. Between them is placed an apparatus 46 which applies a protective liquid to the object being coated. This apparatus includes a spray 47 for the liquid, for instance a pipe 47a pierced with holes, which is attached to a reservoir 48 which is in turn suspended from the upper shield. This reservoir 48 contains a bath of liquid which is mounted at constant level 48a which is mounted by overflow 50. The reservoir 48 is supplied by a distributor 51 which is advantageously composed of a pump having an aspirator line 52 connected to a sump 53 filled with the protective liquid, and with an input line 54 which is connected to the reservoir 48 through a filter 55. The filter 55 catches any impurities which may be found in the protective liquid.

The accelerator 45 is followed by apparatus 56 for wiping and drying, which advantageously includes wiper 60 (for example having a leather or elastomer face) which has two edges 60a and 60b, and is followed by a cylindrical brush 61 mounted for rotation on chasis 23. The brush is driven by a motor or reducing gear 62 through a transmission 63. One of the edges of the wiper, for example 60a, is attached to a frame 64 which is mounted on chassis 23, the other edge 60b being free and disposed at a distance d, of quantity less than a thickness e of the panel 16 above the upper course 31a.

This belt conveyor is followed by the belt conveyor 3 which is quite similar in construction and comprises a frame 65 mounted on the shield 4, rollers 66, 67 respectively inside and outside the enclosure, a motor 68, and a transmission 69. The conveyor has an upper course 70a and a lower 70b which pass through the openings 5. The upper course 70a is associated with discharge apparatus 71 which lifts the panels and deposits them elsewhere. This apparatus can be replaced by an operator who removes the panels by hand.

It is convenient to note that the belt conveyors 14, 31 and 70 may move with the same speed in order to prevent the panels 16 from overlapping. To that end, the motors 10, 28, 68 which drive them are synchronized by a synchronizer 72 which may be mechanical or electrical. Such synchronizers are known and need not be described here. From this it follows that the motors 10, 28, 68 and the transmissions 11, 29 and 69 constitute a unitary driving means which is generally indicated by the numeral 73. Furthermore, whatever the position of the block 25 may be on the ramp 21 the upper face 14a of belt conveyor 1 is preferably at a higher level than that of course 31a of conveyor 2, whereas the level of the latter is higher than the level of the upper course 70a of conveyor 3, thus aligning the three conveyors in descending cascade.

While paints and varnishes of all kinds may be applied succesfully by this apparatus, there are certain novel varnishes which are of superior efficiency which will now be described.

Example 1

12 moles of 1,3 propane-diol (propylene glycol) are put into a reaction vessel prtvided with a rotary agitator after the air in the reaction vessel has been displaced by inert gas. The propylene glycol is then heated to 80° C. while the agitator rotates about 60 r.p.m. 5 moles of maleic anhydride and then 5 moles of phthalic anhydride are put into the reaction while heating slowly and continuing the agitation. When 100° C. has been passed the reaction mass reacts energetically and the temperature rises rapidly to 130° C. A temperature of 140° C. is reached in about 2 hours with distillation of water. The heating is then controlled to produce a rise in temperature of 15° C. per hour, the mass contained in the reactor being kept at 230° C. until it has an acid index of about 50. It is then cooled to 100° C. and about .01% to .1% by weight of a polymerization inhibitor such as hydroquinone or a hydroquinone derivative is added. The product is a liquid resin of polyester type.

To make the varnish one takes 55% of this liquid resin and 45% of styrene and mixes them thoroughly. This varnish is then ready for use in apparatus 32.

In the following examples the varnish composition is described without mentioning the details of preparation, which are similar to those of Example 1.

Example 2

The varnish contained by weight 15% of methyl methacrylate, 55% of the liquid polyester of Example 1, and 30% of styrene.

Example 3

The varnish contained by weight 10% of methyl methacrylate, 5% of a polyisocyanate (in this case "Desmodure S.L." from Bayer–A–G), 60% of the liquid polyester from Example 1 and 25% of styrene.

The addition of isocyanate increases the hardness of the varnish under ionizing radiation or under ionizing particles such as gama rays or negative electrons.

Example 4

As in Example 1, a polyester is prepared from selected quantities of maleic acid, phthalic acid and propylene glycol but the quantity of propylene glycol is in excess so as to provide free hydroxyl groups after the reaction is finished. The propylene glycol is introduced in excess of that required stoichiometrically with the acids, the resulting polyester having hydroxyl groups which are not esterified. To make the varnish one takes 66 parts of this liquid polyester, 33 parts by weight of styrene, and 11.8 parts by weight of toluylene diisocyanate. Because of these free hydroxyl groups the polyester resin reaction, with the release of heat, on the toluylene diisocyanate produces a mixture containing urethane groups. The viscosity of this mixture increases with time, up to about 15 days during which the increase of viscosity is followed. When the viscosity no longer increases, the mixture is ready for use in the apparatus 32.

To use the apparatus in FIGS. 1 to 4 the truck 23 is fixed on the ramp such that the panels 16 will be situated at a distance equal to 12 cm. from the accelerator heads 44 and 45. The motors 10, 28, 68 and transmissions 11, 29, 69 are chosen so as to drive the conveyors at a linear speed of 2.4 cm. per second. The sump 40 is filled with varnish and sump 53 is filled with an aqueous so'ution of protective liquid. This may be plain water but preferably it is an aqueous solution containing less than 2% of a surface active agent, for example a 20% solution in water of the sodium salt of the acid sulfate of oleic acid or preferably the alkali salt of an alkyl benzene sulfonate or an alkylarylsulfonate. Finally, the pumps 35 and 51 are started so as to initiate the painting and the protective liquid spray, the opening 33a being adjusted in preliminary tests to apply the selected thickness of varnish, for instance 300 to 500 microns to the panels.

An operator or the loading apparatus 15, puts a panel 16 on the upper course of the conveyor. The panel may advantageously be covered by a preliminary dressing which has for its object to prevent the evolution of gas from the wood or veneer of the panel under the action of ionizing radiation. This dressing may advantageously be composed of the varnish from the sump 40. The dressing may be polymerized chemically by the use of a polymerization catalyst such as benzoyl peroxide or by ionizing radiation before it enters the enclosure 4.

The panel travels with the band into the enclosure 4 through opening 5 and is deposited upon the conveyor 31 upon which it passes beneath the varnish applicator 32 which applies a thickness of probably 500 microns, carried thence beneath the electromagnetic head 44 and is bombarded with ionizing radiation, receiving possibly 4 megarads from the electron accelerator 44 operating with an energy of emission of 500 to 600 kiloelectronvolts with a current supply at the electron accelerator of .8 milliamperes.

After having received its dose of electrons the varnish layer undergoes the beginning of polymerization and transforms it from a tacky mass to a solid but readily damaged coating. The panel 16 is carried thence under the spray 47, which is at least 60 cm. above the level of the liquid in the reservoir 48. In order to avoid leaving marks or irregularities on the still-soft layer the spray covers the unhardened varnish and protects it from the air. The spray may be water or an aqueous solution containing a surface active agent such as "Teepol." It is to be observed that the film of protective liquid attains a thickness which is not greater than about .5 mm. Under the accelerator head 45 this film undergoes partial evaporation which serves to protect the varnish and the panel from excessive heating and to prevent the evaporation of the volatile parts of the varnish.

Under the head 45 the panel receives a second dose of electrons, for instance 6 megarads, at an electron energy of 500 to 600 kiloelectronvolts derived from a supply current of 1.2 milliamperes. This dose of electrons finishes the polymerization and hardening of the varnish which thereafter presents a flat and smooth surface which is difficult or impossible to scratch with the fingernail. The air has not been able to impede the polymerization of the varnish or to react with any of its ingredients. The surface of the varnish is then wiped with the wiper 60 and the cylindrical brush 61 after which it displays only a few traces of the aqueous protective solution and these disappear rapidly by natural evaporation at room temperature.

The panel is then transferred to the course 70 of conveyor 3 and is carried through downstream opening 5, 6 to the apparatus or operator 71 which removes it in a condition requiring no further treatment and ready for use. It will be noted that any liquid in which the varnish is insoluble can be used for protection but it is preferable when possible to use an aqueous solution of a surface active agent which, surprisingly enough reduces the cost of application. This aqueous solution may evaporate excessively and even disappear completely under the accelerator head 45, for example if the speed of the conveyor is reduced to increase the dose, which leaves the varnish without protection against heat and the effect of air before it is fully hardened. In that case in order to reduce the evaporation glycerol may be added to the solution. A composition of this sort may contain 80% of the aqueous solution of which 2% is surface action agent (e.g. Teepol) and 20% of glycerol. However, if this addition is made it is advisable to rinse the panels before drying them by the wiper and the cylindrical brush. This can be accomplished by imposing a rinsing spray 74 (FIG. 4) between the accelerator and the wiper. As represented that apparatus includes a spray 75 supplied from a reservoir 77 which is suspended from the upper shield 4 by straps 76. The liquid flows from reservoir 77 and pipe 75 upon the panels upon conveyor 31, passing through the course of the conveyor and is caught in sump 78, from which it may be recycled for reuse. It suffices to note that if one wishes to use other protective liquids than Teepol solution one may profitably use a varnish which contains, in addition to resins of the polyester, or acrylic or urethane types described above, compositions of the type $CH_2=CR_1R_2$ in which $R_1$ or $R_2$, or $R_1$ and $R_2$ may be hydrogen or an organic radical preferably lower alkyl, these compounds being associated with acids such as maleic acid, fumaric acid and phthalic acid. (See Charlesby, "Atomic Radiation and Polymers" and Chapiro "Radiation Chemistry of Polymeric Systems.")

The description hereinabove has largely dealt with wooden objects but it is equally applicable to panels of sheet steel, sheet aluminum or aluminum alloys, and to the painting and varnishing of plastic materials of such type as acrylonitrile, styrene or butadiene. It suffices if the paint or varnish or lacquer will adhere to the object being coated.

The most advantageous conditions for the application of the process are readily determined in each particular case by making preliminary tests on an apparatus such as that of FIG. 1. The speed of the conveyor belts can be changed by using a variable speed motor or by replacing the transmissions 11, 29 and 69; the distance of the panels from the accelerator head can be changed by moving the central carriage on the ramp, thus producing different conditions of exposure to the radiation. When the preliminary tests have been made the apparatus can be locked in position for industrial use. It is also possible to modify the apparatus readily to take care of different situations as illustrated in FIGS. 5 to 26.

In FIG. 5 the conveyor is a single belt conveyor similar in construction to those hereinbefore described but simpler. Similar elements are indicated by identical numbers. The upper course 14a of the conveyor passes beneath the motor 15, the varnish applicator 32, the first accelerator 44, the liquid spray 46, the accelerator 45 and the wiping and drying apparatus 56 and the discharge apparatus 71. The drive 73 is reduced to a motor 10 and transmission 11, omitting the synchronizer 72. The operation of this form of the invention is so similar to that hereinabove described that additional description is unnecessary.

In FIG. 6 the belt conveyor 1 is associated with the loader 15, the varnish applicator 32, the accelerator 44, and the spray 46, whereas the screen 3 is associated with the accelerator 45 and the unloader 71, the wiper 56 and the belt conveyor 2 being eliminated. Between the conveyors 1 and 3 is interposed an apparatus 80 for draining and tilting the panels including a frame 81 on which are mounted an appropriate number of rollers 82, at least one of which is driven by a motor 83 (FIGS. 7 and 8), through a transmission 84. On this frame is also mounted for vertical sliding movement through bearings 85 a pusher having as many parts as is necessary for practical use. This involves two horizontally extending arms 86 which are connected to a cylinder and piston 90 which elevates the pusher arms at command between an upper and lower position as indicated by the arrows g and h in FIG. 8. The rollers 82 have abutments 82b at one end which prevent the titlted panel from sliding off the end of the roller. A detector 88 connected to the frame 81 cooperates with the elevator mechanism 87 to tilt the panel as soon as the panels reaches it. Detailed description of such operating mechanism is unnecessary. The excess fluid drains into the sump 53.

The apparatus of FIGS. 6, 7, 8 and 9 involves the following construction: the command apparatus 87 includes a source of fluid under pressure 89, and a rod 86a which is operated from the piston 90. The piston is a pneumatic jack (FIG. 9) of which the piston 92 within the cylinder 91 is normally maintained in lower position by a spring 94. When the contact 88 is activated by the panel, appraratus 95 is activated to open the valve to admit pressure from source 89 to a position beneath the piston 93. The electromagnetic valve 95 is operated by means of a winding 96 connected to a source of current 97 (FIG. 10) and is inserted between the cylinder 91 and the source 89 and between that cylinder and the atmosphere. This valve is operated by a governor 100 which is in turn operated by the detector 88. The elements 100, 88, and 95 are interconnected by ordinary electrical connections indicated in dotted lines without numerals. As shown in FIG. 10, this governor may include electrical conductors 101, 102 connected to a source of power 97 and to ground. Between these conductors are connected three lines 103, 104, 105, in the first of which is inserted the contact 88, contact 106 and a relay 107 having two contacts 107a and 107b of which the first is of retarded action, the delay of which may be varied. In the second line 104 is interposed the electric contact 107a and the winding 96 of the electromagnetic valve. The third line 105 connects a combiner 108 to conductors 102 and 101 at once through contact 107b and line 105, and through contact 109. The combiner 108 includes a synchronous electric motor 110 (FIG. 11) which includes a reducer 111 having an axis 112. This motor reducer is mounted on the frame 81 or on the inclosure. Cams 113 and 114 are fixed on the axle 112 and are associated with contacts 106, 109 which have arcs 113a, 113b, 114a, 114b of variable value, these values being set by the existence of means well known is themselves and which need not be described here. The contact 106 is opened or closed depending upon whether it touches the arc 113a or the arc 113b. Similarly, the contact 109 is opened or closed depending upon whether it touches the arc 114b or 114a. Although the operation of this apparatus is sufficiently plain from its description, it may be of benefit to describe it somewhat more in detail. Before the tilting apparatus 80 receives a panel the contact 88 is opened and the arcs 113b and 114b of the cams touch the contacts 106 and 109. These contacts are in consequence respectively closed and opened. The motor 83 turns the rollers 82. When the panel 16 has closed the contact 88 (FIG. 7) the relay 107 is excited and the contacts 107a, 107b are closed. The motor 110 supplied by contact 107b begins to turn and drives the saft 112 and the cams 113, 114 at a constant speed which is proportioned to the frequency of line 97. It follows that the arc 114a of cam 114 touches and closes the contact 109 while the arc 113b continues in contact with contact 106, which remains closed. The closing of contact 107 energizes the coil 96 which operates the valve 95 which is inserted between the source 89 of fluid under pressure and the tilting mechanism 90, which rises beneath the panel lifting it and simultaneously draining it into the sump 53, opening contact 88 and ending the excitation of relay 107. Contact 107b opens but the motor 110 and the axle 112 continue turning with cams 113, 114, the motor being supplied through closed contact 109. Although the relay 107 is no longer excited the lifting of panel 16 continues because of the delay of contact 107a which continues the feeding of coil 96 of the electromagnetic valve. The panel is in consequence tilted at an angle of inclination of predetermined size by regulating the amount of delay of contact 107a. When this delay has passed, the electromagnetic valve 95 is again energized and the panel descends under the thrust of spring 94 until it is again flat on the rollers 82. The contact 88 is closed but the relay 107 is no longer excited by means of contacts 88 and 106 because of the system established by arcs 113a, 113b. It is arc 113a which touches the contact 106 keeping it open and preventing the excitation of relay 107. As a result the panel continues on without again being raised but after having been drained during the interval of time established by the delay provided for by contact 107a, its progression on apparatus 80 continuing on the rollers 82 driven by motor 83. Thereafter these rollers pass the panel onto the conveyor 3, opening the contact 88. The combiner 108 continues to turn and again brings the arcs 113b of cams 113, 114 into relation with contacts 106, 109. As a consequence, these contacts, respectively close and open, the opening of contact 109 stops the motor 110.

Once on the conveyor 3, the panel is carried under the electron accelerator 45 which partially evaporates the aqueous film which, as a result of the successive actions of draining and evaporation becomes so thin that it is possible to omit the drying apparatus 56. It will be observed that in the apparatus represented in the drawing the rollers 82 have an access 82a having a collarette 82b (FIG. 8), a drainage funnel 115 supplied with pipe 116 opening into the sump 53. The collarette 82b serves the double function or arresting the panels when they are tilted and of arresting the liquid drained from them, preventing it from wetting the axle 82a of the rollers and compelling it to flow into the sump 53.

FIG. 12 shows an installation which has no tilting mechanism but which in spite of that tilts the panels to drain off the protective liquid. The conveyor includes two parts 1 and 3 (FIG. 6) which are associated with elements 32, 44, 46 and 45 but the upper course of the conveyor is disposed at a higher level than the upper course 70a which tilts the panel when it is transferred from one conveyor to the other.

It will be observed that the frames 7 and 65 may be identical on condition of inserting a block 120 under frame 7. Accelerators 44 and 45 may also be identical when their bodies 44b, 45b have straps 44c, 45c (FIGS. 13 and 14) with an extension 45d interposed between straps 45c so as to establish a predetermined distance between the head 45a and the course 70a.

Figure 18:
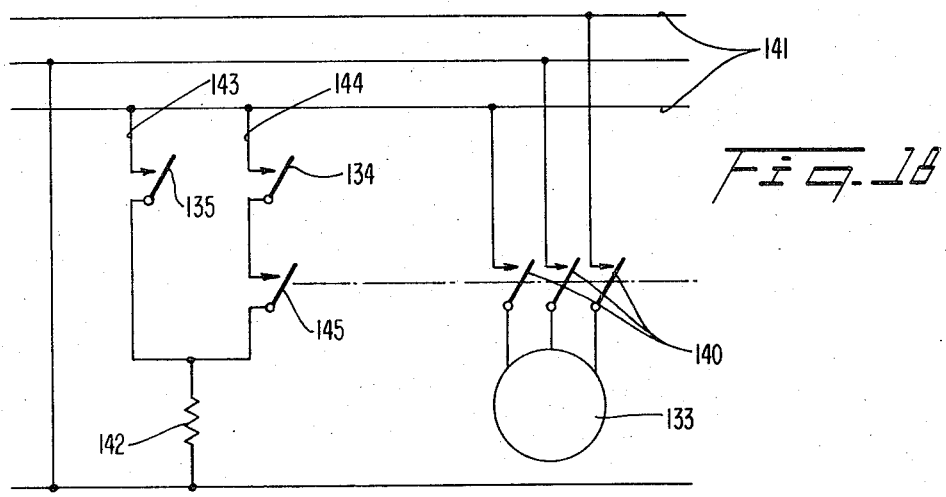
FIG. 18 is a diagram of the electrical circuits for the transfer and wiping mechanism of FIG. 15.

On FIGS. 15, 16 and 17 is represented an apparatus in which the conveyor constitutes screen 1 associated with elements 32, 44, 46, by the belt conveyor 3 associated with accelerator 44 and by transfer and draining mechanism 121 which transfers the panels from the upper course 14a of screen 1 to the upper course 70a of screen 3. These screens disposed side by side, running in opposite directions, have diffierent speeds because of driving apparatus 73. As represented on the drawing, this driving apparatus is formed of a motor 10 and a mechanism 122 which is both reducer or multiplier and reverser, and drive 11, 69. The transfer apparatus 121 includes gears 123, 124, 125, 126 mounted for rotation on the frame 7 or on a platform 7a fixed to the frame. Axles 127 and 128 support the gears 123, 124, 125 and 126. Chains 129, 130 are mounted on the gears. Each chain has at least one prong 131, 132. A motor 133 drives one of the axles 127, 128 and is provided with a starting unit 133a. A detector 134 cooperates with at least one of the prongs, for example 131, and a detector 135 reveals the arrival of a panel, this detector being advantageously mounted on the frame 7. Connections indicated in FIG. 15 in dotted lines are established between the detectors and the starting unit 133a. The starting unit may be of a type well known in itself, for example a contact 140 (FIG. 18) inserted between the motor 133 and the power line 141. This contactor being activated by a command coil 142 having two sources of excitation 143, 144 (FIG. 18). In one of these sources, for example 143, is interposed an electric contact which plays the role of detector 135. In the other source 144 are interposed in series an electric contact playing the role of detector 134 and an electric contact 145 connected to the contact 140, this connection being indicated on the drawing by dot-dash lines.

We will now describe the operation of FIGS. 15 to 18 assuming that the motor 133 is stopped and that the prongs 131, 132 are above the course 14a of conveyor 1 and not beside it. It will be assumed that contacts 135 and 145 and contacts 134 are respectively opened and closed as is conventional with starters, releasing apparatus 73 in order to drive the conveyors 14a, 70a at different speeds, which are established by the motor 10 of the reducer-multiplier 122 and the tranmission. A panel having received its varnish and a first dose of electrons receives a protective film and closes the contact 135, which closes the contacts 145 and 140 by which the coil 142 is excited simultaneously by routes 143 and 144. The contact 140 thus energizes motor 133, starting apparatus 121 of which the prongs 131, 132 engage the panel with impact spilling off the protective liquid and transferring the panel onto the conveyor 3 (arrow k). The contact 140 remains closed, the coil 142 continues to be excited by route 144 until the prong 141 opens the contact 134 and stops the motor 133. This prong after having made the full circuit is again above and outside of the conveyor course 14a and the apparatus 121 is again ready to accept and transfer a second panel.

After it is transferred, the first panel, entrained by course 70a passes again under the accelerator 44 to receive a second dose of electrons which provokes simultaneously the hardening of the varnish already solidified by the first dose and the partial evaporation of the protective liquid already thinned by the impact of the prongs. This construction permits the dryer 56 to be eliminated.

We will now describe as a non-limiting example a method of application of the process as carried out by the apparatus of FIGS. 15 to 18.

When the thickness of the layer of varnish, for instance one of those described in Examples 1 to 4, and the speed of the band 70 attain respectively values of 500 microns and 2.4 cm. per second the accelerator 44 will exhibit the following conditions: energy of electrons emitted 500 to 600 kiloelectronvolts; intensity of current of supply 1.2 milliamperes.

The motor 10 and the drive are chosen to move the conveyor 3.6 cm. per second. The first and the second doses of electrons correspond to exposures of 4 megarads and 6 megarads respectively. After receipt of the second dose of electrons only traces of protective liquid remain on the panel and these will disappear by natural evaporation. In some cases another conveyor succeeds conveyor 3 to carry the panels to a point of discharge, affording ample time for evaporation. Values given are illustrative. Conveyors 14 and 70 might be operated at speeds of about 15 cm. per second and 12 cm. per second on condition of adjusting the current supply of the accelerator 44 to several milliamperes. Furthermore, there has been shown in dot and dash lines on FIG. 17 prongs 131a, 132a fixed on chains 129 and 130 between prongs 131 and 132. When the coil 142 is excited by route 144 it remains closed until the prong 131a opens contact 134 and stops the motor. At that instant the prongs 131, 131a, 132, 132a have changed their positions after a half turn and the apparatus is again ready to accept a panel. The addition of prongs 131a, 132a consequently doubles the output of the transfer mechanism.

The apparatus applies any kind of coating composition, paint, varnish or lacquer, or any other type of fluid to the body which passes beneath it and subjects the coating to the process.

It is particularly to be noted that the process permits the coating of a sheet of material 16' (FIG. 19) which is in a roll 8a, is led around rollers 8 through aperture 5 and is wound onto another roller 8b. The sheet is drawn into the chamber 4, passes under the coating composition applicator, under the first accelerator, is given its protective liquid coating, passes under the second accelerator, is wiped and dried in any conventional way and is wound on the roll 8b. Both cloth and resinous materials can be treated in this way. As shown in FIG. 19, a brake 146 of known type maintains the tension on the ribbon. FIG. 19 shows a different method of applying the coating. A reservoir contains the coating composition. A roller 147 dips into the coating composition, is rotated, transfers the composition to roller 152 which in turn applies it to the ribbon 16'. A variable speed motor 151 drives the applicator.

Example 5

For a varnish one may use the mixtures cited in Examples 1 to 4 for application according to FIG. 19. The present example reveals the use of paint and is equally applicable to spraying by apparatus 32 or application by roller as in FIG. 19. The sump 40 contains the following composition: 36 parts of $TiO_2$; 100 parts of a coating composition which is itself composed of 55 parts of the liquid resin of Example 1, 15 parts by weight of methyl methacrylate and 30 parts by weight of styrene. After hardening that paint is of brilliant aspect and can be wound on rollers without cracking.

Example 6

A paint was made by mixing 100 parts of the coating composition of Example 5 with 56 parts of $TiO_2$. These paints are white because of the presence of titanium dioxide but it is possible to include in them any other type of pigment, for example diazo pigments and metallic pigments.

Figure 20:
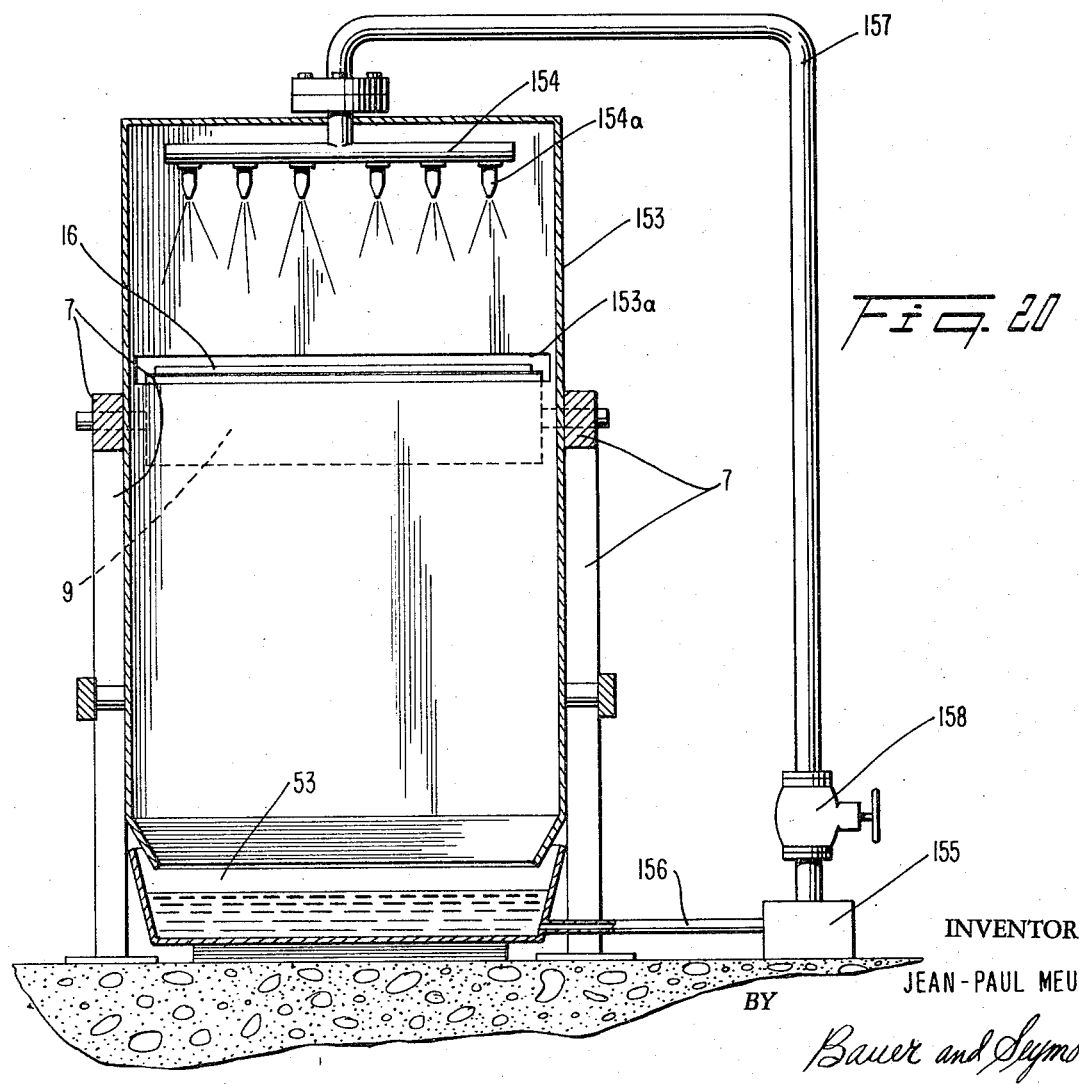
FIG. 20 is a section on line XX—XX of FIG. 19.

After solidification under the accelerator 44 the ribbon passes to apparatus 46 which is constructed as shown in FIG. 20 and includes the shield 153 carried by the frame 7 having an opening 153a through which the ribbon passes. The shield includes a tube 154 with an appropriate number of nozzles 154a which are supplied with liquid under pressure from a reservoir, for example by use of a motor pump 155 which is susceptible of supplying an operative pressure on the order of 1 to 2 kgs. per square centimeter and an output which is a function of the number of nozzles 154a and the speed of displacement of the ribbon. A pipeline 156 carries the liquid to the pump and a pipe 157 connects the pump to the spraying head 154 through valve 158. The ribbon having received its protective deposit under apparatus 46 passes beneath the accelerator 45 so as to harden the coating, thence proceeding to the wiping or drying apparatus 56.

In FIG. 21 the apparatus may be formed by a distributor 160 of gas or compressed air supported on the frame and supplying two lines of jet nozzles 163b and 163c through a common connection 163, 162. The angular relation of the two rows of jets may be changed. They are shown at about 45° to the axis of the ribbon. The valve 158 can, by adjustment, vary the thickness of the protective liquid which is applied to the surface of the ribbon, which can be adjusted to a thickness less than 4 tenths of a millimeter. A film of such thickness can be readily wiped or dried off by the air from the apparatus 160.

FIG. 22 shows another form of drying apparatus including pullies 164 mounted on frame 7, a ribbon brush 165 which acts to sweep the ribbon, and a driving gear 166, 164.

As the dose of electrons received under the accelerator 45 heats the ribbon, the action of the band brush in brushing the ribbon is sufficient to remove all but traces of the protective liquid from the coating composition, and these traces disappear by natural evaporation before the ribbon reaches the windup roller.

In FIG. 23 is apparatus analogous to FIG. 5 which diagrammatically indicates conveyor 1 for transporting panels 16 toward the left. Loader 15 lays the panel on the conveyor, which transports it beneath painting apparatus 32, through slit 5 into enclosure 4, under accelerator head 44, under liquid spray 46, under accelerator head 45, and the wiper-dryer 56. The panels are put on the conveyor by hand or machine, covered with coating composition, irradiated until solidified but not to hardness, covered with protective liquid containing a wetting agent, irradiated again and to hardness, drained and dried and removed, after passing out through slit 5, by hand or by machine 71.

In FIG. 24 the first electron accelerator is replaced by heater 244 which is efficiently associated with the coating composition applicator. The protective liquid is applied at 46, the panel enters the enclosure 4 through slit 5, and is irradiated to hardness and dried. The heater solidifies the fluid coating composition. This reduces the size of the closure and the amount of shielding required, and eliminates an expensive electron accelerator in favor of a relatively inexpensive heater.

Example 7

A coating composition is made from 28% by weight of the liquid resin of Example 1, 14% of styrene (monomer), 17% of kaolin, 10% precipitated $CaCO_3$, 15% of a double natural carbonate of Ca and Mg, 5% talc, 10% lithopone containing 30% ZnS and 70% $BaSO_4$, and 1% of bentonite.

This mixture is painted on the panel to a thickness of about 150 microns as described above, or by the novel apparatus of FIGS. 25 and 26 in which a tray 167 is filled with the mixture, which is picked up by a driven roller 168, transferred to another roller 169 and to a third 170 which applies it to the panel. The panels are carried by the conveyor 1 into the oven 173 in which the composition is solidified, passing thence to 46 for its coating of protective liquid.

The oven may be heated in any way, by hot air or gas, by electricity, by steam, by infra red rays, and the application of the heating medium may be direct or indirect. FIG. 26 illustrates an oven heated by circulating hot air. The oven 173 receives a flow of hot air from heater 175, 177, 178 through pipe 174. A discharge pipe 176 releases a flow of spent air from the oven. During its passage through the oven the air picks up combustible products from the drying composition. This requires that these gases be removed rapidly to a distance. The fan 178 drives the air through tube heater 175–177, through the oven, and through tube 176 to a safe distance.

The oven may contain air at, e.g., 150° C., derived from generator 175. Residence in the oven for one minute will suffice to gel (solidify) such compositions at such temperatures to an extent sufficient to obviate damage by the protective spray. The oven may be about six meters long when the speed of the conveyor is 10 cm. per second.

After application of the protective liquid these panels are irradiated by accelerator 45 (FIG. 24) which has a band of electrons of about 350 to 500 kiloelectronvolts. This band, having an intensity of 150 microamperes per centimeter of width of band, taken perpendicularly to the direction of the conveyor, subjects the coating composition to a dose of about 5 megarads. If the protective liquid is water with a wetting agent (surface active agent) a rinsing apparatus (FIG. 4) should follow the accelerator.

It should be remembered that the interposition of a primer coat is to prevent the degassing of the wood, or other object treated, under the impact of the rays.

Example 8

The following is another example of a paint according to this invention:

28% of the resin of Example 1, by weight
14% styrene
10% kaolin
10% precipitated $CaCO_3$
4% talc
2% bentonite
32% lithopone of 30% ZnS and 70% $BaSO_4$ This mixture is freed with a small amount of solvent, such as methyl ethyl ketone, methyl isobutyl ketone, methyl-n butyl ketone, by cautious additions and stirring until the desired fluidity is attained; usually 100 parts by weight to 10 parts of the solvent suffices to produce a paint having a viscosity of about 4 poises which can be applied by apparatus 32 (FIG. 2) to produce a layer about 75 microns thick. This is then dried in oven 244 (FIG. 24) for 30 seconds by air heated to about 150° C. in the heater. The oven has a length of 3 meters and the speed of the panels is 10 cm. per second. The layer is then irradiated and further treated in accordance with the foregoing description.

The advantages of the invention are advantages of process, advantages of coating compositions adapted to the process, advantages of superior products, advantages of high production, advantages of apparatus and machines, and advantages derived from a combination of two or more of these things. A particular advantage arises from the invention of a way to employ ionizing radiation for the solidification (setting) and hardening of coating compositions. Other advantages are the elimination or reduction of the disadvantages inherent in prior systems which attempted to use the techniques of irradiation to hasten the drying of coating compositions.

The invention has been described in its use for coating panels, but it is equally useful for the application of coating compositions to any type of object, regardless of shape or size. Coating compositions are customarily adherent but inert to the object coated, and this invention does not depart from that principle.

As many apparently widely different embodiments of the present invention may be made without departing from the spirit and scope thereof, it is to be understood that the invention is not limited to the specific embodiments.

What is claimed is:

1. A method of painting an object which comprises applying thereto a fluid coating composition having a hardenable vehicle, solidifying the coating composition by exposing the coated object to ionizing radiation of solidifying duration and intensity, applying a liquid film transparent to ionizing radiation and impermeable to oxidizing gases to the coating composition, and applying ionizing radiation of hardening intensity through the said film to the coating composition until it is hardened.

2. The method of claim 1 including the step of removing the transparent film after the application of the ionizing radiation.

3. The method of claim 1 in which the application of ionizing radiation is carried out within an enclosure impermeable to ionizing radiation.

4. A method according to claim 1 in which the film contains at least one of a surface active agent and a water soluble extender.

5. A method of providing a panel with a protective surface which comprises applying a coating composition having a hardenable vehicle to the surface to be protected, moving the coated panel through an opening into an enclosure of low oxygen content and impermeable to ionizing radiation, applying ionizing radiation of solidifying intensity and duration to the panel, coating the solidified coating composition with an aqueous protective film, applying ionizing radiation through the film to the coating composition until it hardens, and removing the panel from the enclosure.

6. The method of claim 5 in which the coating composition contains an inhibitor of polymerization.

7. The method of claim 5 in which the film forming ingredients of the coating composition comprise a polyester.

8. The method of claim 7 in which the polyester contains free hydroxy groups.

9. The method of claim 8 in which the film forming material also contains urethane groups.

10. The method of claim 7 in which the composition also contains a pigment.

11. The method of claim 7 in which the liquid film is water.

12. The method of claim 5 in which the film forming ingredient of the coating composition comprises a polyester and styrene.

13. The method of claim 12 in which the film forming ingredient also includes at least one of a methacrylate and a polyisocyanate resin.

14. A method of painting an object which comprises applying thereto a fluid coating composition, solidifying it with ionizing radiation, coating it with a liquid film transparent to ionizing radiation and impervious to gas, and applying ionizing radiation through the film.

15. A method of affixing a fluid coating composition of polyester-styrene type to an object which comprises painting the object with the fluid coating composition, solidifying the coating on the object by passing the coated object through a field of ionizing radiation of intensity and duration insufficient to harden it, sealing the coated surface of the object against gas by applying an aqueous liquid protective agent thereto, removing excess liquid from the surface, and passing the object through a field of ionizing radiation.

16. A method according to claim 15 in which the application of ionizing radiation is carried out in an enclosure having a minimum content of oxygen.

References Cited

UNITED STATES PATENTS

| | | | |
|---|---|---|---|
| 3,188,165 | 6/1965 | Magat et al. | 117—93.31 X |
| 3,544,349 | 12/1970 | Isaksen et al. | 117—6 |
| 2,542,304 | 2/1951 | Boucher | 117—6 X |
| 3,101,275 | 8/1963 | Cairns et al. | 117—93.31 X |

KENNETH P. GLYNN, Primary Examiner

U.S. Cl. X.R.

117—62, 93.3, 93.31